United States Patent
Hiroe et al.

(10) Patent No.: US 11,049,493 B2
(45) Date of Patent: Jun. 29, 2021

(54) SPOKEN DIALOG DEVICE, SPOKEN DIALOG METHOD, AND RECORDING MEDIUM

(71) Applicant: National Institute of Information and Communications Technology, Tokyo (JP)

(72) Inventors: Atsuo Hiroe, Tokyo (JP); Takuma Okamoto, Tokyo (JP)

(73) Assignee: NATIONAL INSTITUTE OF INFORMATION AND COMMUNICATIONS TECHNOLOGY, Tokyo (JP)

(*) Notice: Subject to any disclaimer, the term of this patent is extended or adjusted under 35 U.S.C. 154(b) by 62 days.

(21) Appl. No.: 16/320,810

(22) PCT Filed: Jul. 24, 2017

(86) PCT No.: PCT/JP2017/026681
§ 371 (c)(1),
(2) Date: Jan. 25, 2019

(87) PCT Pub. No.: WO2018/021237
PCT Pub. Date: Feb. 1, 2018

(65) Prior Publication Data
US 2019/0172444 A1 Jun. 6, 2019

(30) Foreign Application Priority Data
Jul. 28, 2016 (JP) .............................. JP2016-148984

(51) Int. Cl.
*G10L 15/22* (2006.01)
*G10L 15/00* (2013.01)
(Continued)

(52) U.S. Cl.
CPC .............. *G10L 15/005* (2013.01); *G06F 3/16* (2013.01); *G06F 40/268* (2020.01); *G10L 13/00* (2013.01);
(Continued)

(58) Field of Classification Search
CPC ...... G10L 15/005; G10L 13/086; G06F 40/58
See application file for complete search history.

(56) References Cited

U.S. PATENT DOCUMENTS 6,922,670 B2 * 7/2005 Yamada ................. G06F 3/167
704/270
7,930,182 B2 * 4/2011 Sinai ........................ G06F 8/38
704/270

(Continued)

FOREIGN PATENT DOCUMENTS

| JP | 2009-211629 A | 9/2009 |
| JP | 2015-118710 A | 6/2015 |

OTHER PUBLICATIONS

T. Okamoto et al., "Cross lingual voice dialogue based on a parallel connection of language understanding WFST", presentation paper of the Acoustical Society of Japan, Sep. 2015, pp. 35-38, with English translation.

(Continued)

*Primary Examiner* — Michael N Opsasnick
(74) *Attorney, Agent, or Firm* — McDermott Will & Emery LLP

(57) ABSTRACT

[Problem] With conventional technology, it is impossible to appropriately support spoken dialog that is carried out in multiple languages. [Solution] A spoken dialog device includes: a receiving unit that detects a voice section from a start point to an end point of an input speech that is spoken in any of two or more different languages, and acquires speech data corresponding to the voice section; a language identifier acquisition unit that acquires a language identifier (Continued)

that identifies a language in which the input speech was spoken; a speech recognition unit that generates a text resulting from speech recognition, based on the input speech and the language identifier; a dialog control unit to which a text resulting from speech recognition and a language identifier are input, and that generates a different output sentence depending on a language identifier, while maintaining dialog history even when the language identifier is different from the previous language identifier; a speech synthesizing unit that generates a speech waveform based on the output sentence and the language identifier; and a speech output unit that outputs a speech that is based on a speech waveform generated by the speech synthesizing unit. With such a spoken dialog device, it is possible to appropriately support spoken dialog that is carried out in multiple languages.

5 Claims, 24 Drawing Sheets

(51) Int. Cl.

| | | |
|---|---|---|
| *G10L 13/00* | (2006.01) | |
| *G10L 15/10* | (2006.01) | |
| *G10L 15/04* | (2013.01) | |
| *G06F 3/16* | (2006.01) | |
| *G06F 40/268* | (2020.01) | |
| *G10L 13/08* | (2013.01) | |
| *G06F 40/58* | (2020.01) | |

(52) U.S. Cl.
CPC ............ *G10L 13/086* (2013.01); *G10L 15/00* (2013.01); *G10L 15/04* (2013.01); *G10L 15/10* (2013.01); *G10L 15/22* (2013.01); *G06F 40/58* (2020.01); *G10L 2015/225* (2013.01)

(56) References Cited

U.S. PATENT DOCUMENTS

| | | | | |
|---|---|---|---|---|
| 9,721,563 | B2* | 8/2017 | Naik | G10L 15/187 |
| 2006/0253272 | A1* | 11/2006 | Gao | G10L 13/00 |
| | | | | 704/2 |
| 2010/0153453 | A1* | 6/2010 | Knowles | G06Q 10/107 |
| | | | | 707/784 |
| 2012/0209848 | A1* | 8/2012 | Christensen | G11C 7/1096 |
| | | | | 707/737 |
| 2015/0142420 | A1* | 5/2015 | Sarikaya | G06F 40/35 |
| | | | | 704/9 |
| 2015/0223731 | A1* | 8/2015 | Sahin | A61B 5/1123 |
| | | | | 600/301 |
| 2016/0078020 | A1* | 3/2016 | Sumita | G10L 15/26 |
| | | | | 704/9 |
| 2018/0177451 | A1* | 6/2018 | Sahin | A61B 5/1112 |
| 2019/0347323 | A1* | 11/2019 | Riesa | G06N 3/04 |
| 2020/0337631 | A1* | 10/2020 | Sahin | A61B 5/1123 |

OTHER PUBLICATIONS

International Search Report issued in Application No. PCT/JP2017/026681 dated Oct. 3, 2017, with English translation.

* cited by examiner

| ID | STARTING NODE IDENTIFIER | ENDING NODE IDENTIFIER | FIRST DIALOG ACTION TAG | SECOND DIALOG ACTION TAG | WEIGHT | OPERATION IDENTIFIER |
|---|---|---|---|---|---|---|
| 1 | 0 | 1 | — | intro | 1 | — |
| 2 | 1 | 2 | q.spot | — | 1/4 | SPOT SEARCH (USER) |
| 3 | 1 | 3 | q.spot | — | 3/4 | SPOT SEARCH (PLACE) |
| 4 | 1 | 7 | q.weather | a.weather | 1 | — |
| 5 | 1 | 8 | thanks | a.end | 1 | — |
| 6 | 2 | 4 | — | a.spot | 1 | — |
| 7 | 3 | 4 | — | a.spot | 1 | — |
| 8 | 4 | 1 | thanks | — | 1 | — |
| 9 | 4 | 5 | q.how-to-take | a.how-to-take | 1 | — |
| 10 | 5 | 6 | q.cost | a.cost | 1 | — |
| 11 | 6 | 1 | thanks | a.end | 1 | — |
| 12 | 7 | 1 | eps | — | 1 | — |

FIG.8

| ID | FIRST DIALOG ACTION TAG | PARTIAL TEXT |
|---|---|---|
| 1 | q.spot | 観光スポット |
| 2 | q.spot | recommend for sightseeing |
| 3 | thanks | ありがとう |
| 4 | thanks | どうも |
| 5 | thanks | thank |
| 6 | thanks | 谢谢 |
| 7 | q.how-to-take | どれくらいかかる |
| 8 | q.weather | 天気 |
| 9 | q.weather | weather |
| 10 | q.how-to-take | how long |
| ⋮ | ⋮ | ⋮ |

FIG.10

| ID | OUTPUT SENTENCE INFORMATION |||
|---|---|---|---|---|
| | SECOND DIALOG ACTION TAG | OUTPUT SENTENCE |||
| | | JAPANESE | ENGLISH | CHINESE |
| 1 | intro | こんにちは。<br>⋮ | Hello.<br>⋮ | 你好。<br>⋮ |
| 2 | a.spot | \<spot\>が<br>おすすめです。<br>⋮ | I recommend \<spot\>.<br>⋮ | 我的建议是\<spot\>。<br>⋮ |
| 3 | a.weather | 今日は、<br>\<weather\>です。<br>⋮ | It is \<weather\> today.<br>⋮ | 今天是\<weather\>。<br>⋮ |
| 4 | a.end | ありがとう<br>ございました。<br>⋮ | Thank you.<br>⋮ | 谢谢。<br>⋮ |
| 5 | a.how-to-take | \<from\>から\<trans\>で<br>\<time\>かかります。<br>⋮ | It take \<time\> by \<trans\> from \<from\>.<br>⋮ | 它需要\<time\><br>的\<trans\><br>从\<from\>。<br>⋮ |
| 6 | a.cost | \<cost\>かかります。<br>⋮ | It takes \<cost\>.<br>⋮ | 它需要\<cost\>。<br>⋮ |

FIG.11

| Ranking | spot | from | time | trans | cost |
|---|---|---|---|---|---|
| 1 | JAPANESE:京都<br>ENGLISH:Kyoto<br>CHINESE:京都 | JAPANESE:東京<br>ENGLISH:Tokyo<br>CHINESE:東京 | 2.5h | JAPANESE:新幹線<br>ENGLISH:Shinkansen<br>CHINESE:子弹头列车 | ¥13,000- |
| | | JAPANESE:大阪<br>ENGLISH:Osaka<br>CHINESE:大阪 | 0.5h | JAPANESE:電車<br>ENGLISH語:train<br>CHINESE: 铁路 | ¥1,500- |
| | | JAPANESE:北海道<br>ENGLISH:Hokkaido<br>CHINESE:北海道 | 5h | JAPANESE:新幹線<br>ENGLISH:Shinkansen<br>CHINESE:子弹头列车 | ¥50,000- |
| 2 | JAPANESE:北海道<br>ENGLISH:Hokkaido<br>CHINESE:北海道 | JAPANESE:東京<br>ENGLISH:Tokyo<br>CHINESE:東京 | 4h | JAPANESE:飛行機<br>ENGLISH: airplane<br>CHINESE:飞机 | ¥40,000- |
| | | JAPANESE:京都<br>ENGLISH:Kyoto<br>CHINESE:京都 | 5h | JAPANESE:飛行機<br>ENGLISH: airplane<br>CHINESE:飞机 | ¥50,000- |
| | | JAPANESE:大阪<br>ENGLISH:Osaka<br>CHINESE:大阪 | 4.5h | JAPANESE:飛行機<br>ENGLISH: airplane<br>CHINESE:飞机 | ¥50,000- |
| ⋮ | ⋮ | ⋮ | ⋮ | ⋮ | ⋮ |

FIG.12

| ID | OUTPUT SENTENCE CHANGE INFORMATION ||||
|---|---|---|---|---|
| | LANGUAGE CONDITION | CHANGE RANGE | CHANGE CONTENT ||
| | | | TYPE | POSITION | CONTENT |
| 1 | Lang=ENGLISH | Hokkaido | ADDITION | SENTENCE END | Hokkaido is in the northern part of Japan. |
| 2 | Lang=CHINESE | 北海道 | ADDITION | SENTENCE END | 北海道位于日本的北部。 |
| 3 | Lang=JAPANESE | (%d)元 | REPLACEMENT | SAME POSITION | yuan_to_yen($1)円 |
| ... | ... | ... | ... | ... | ... |

FIG.13

| ID | STARTING NODE IDENTIFIER | ENDING NODE IDENTIFIER | FIRST DIALOG ACTION TAG | LANGUAGE IDENTIFIER | SECOND DIALOG ACTION TAG |
|---|---|---|---|---|---|
| 1 | 0 | 1 | — | — | intro |
| 2 | 1 | 7J | q.weather | JAPANESE | a.weather.ja |
| 3 | 1 | 7E | q.weather | ENGLISH | a.weather.en |
| 4 | 1 | 7Z | q.weather | CHINESE | a.weather.zh |
| 5 | 1 | 8 | thank | — | a.end |
| 6 | 7J | 1 | eps | — | — |
| 7 | 7E | 1 | eps | — | — |
| 8 | 7Z | 1 | eps | — | — |

FIG.17

| ID | OUTPUT SENTENCE INFORMATION | | | |
|---|---|---|---|---|
| | SECOND DIALOG ACTION TAG | OUTPUT SENTENCE | | |
| | | JAPANESE | ENGLISH | CHINESE |
| 1 | intro | こんにちは。<br>. . . | Hello.<br>. . . | 你好。<br>. . . |
| 2 | a.weather.ja | 今日は、黄砂に注意して下さい。<br>. . . | —<br>. . . | —<br>. . . |
| 3 | a.weather.en | —<br>. . . | Today, note the yellow sand phenomenon. The yellow sand phenomenon is dust carried on high winds from China.<br>. . . | —<br>. . . |
| 4 | a.weather.zh | —<br>. . . | —<br>. . . | 注意今日黄沙。<br>. . . |
| 5 | a.end | ありがとうございました。<br>. . . | Thank you.<br>. . . | 谢谢。<br>. . . |

FIG.19

SPOKEN DIALOG DEVICE, SPOKEN DIALOG METHOD, AND RECORDING MEDIUM

RELATED APPLICATIONS

This application is a national stage of International Application No. PCT/JP2017/026681, filed Jul. 24, 2017, which claims the benefit of Japanese Application No. 2016-148984, filed on Jul. 28, 2016, the disclosures of which are incorporated in their entirety by reference herein.

TECHNICAL FIELD

The present invention relates to, for example, a cross-lingual spoken dialog device, which is a spoken dialog device that supports dialog that is carried out in multiple languages.

BACKGROUND ART

A system that is capable of, in a case where speeches in multiple languages coexist, generating a spoken dialog sentence while taking over history of dialogs carried out in a different language, is called a "cross-lingual spoken dialog system". There is a conventional cross-lingual spoken dialog system that employs the framework of a weighted finite-state transducer (WFST) (for example, see Non-patent Document 1).

CITATION LIST

Non-Patent Document

Non-patent Document 1: OKAMOTO Takuma, HIROE Atsuo, HORI Chiori, KAWAI Hisashi, "Cross-lingual spoken dialogue management based on parallel-connected spoken language understanding WFST", a collection of papers from 2015 Autumn Meeting of the Acoustical Society of Japan, pp. 35-38, September, 2015.

SUMMARY OF INVENTION

Technical Problem

However, with conventional technologies, while a spoken dialog system can take over dialog history when a language (an input language) used by a user is switched to another, the system cannot change a response according to the input language. Also, with conventional technologies, in a case where multiple users who speak different languages are located in remote places, such as in a case where a spoken dialog device is employed in a videophone, a video conference system, or the like, it is difficult to realize a person-to-person call while appropriately using the spoken dialog device. For example, during a video conference, it is difficult to realize the following case: when one of the users asks the spoken dialog system a question, the system answers the question, another user who speaks another language asks the system a question regarding the answer in another language, and the system appropriately answers such a question as well.

In view of the above-described problem, the present invention aims to appropriately support spoken dialog that is carried out in multiple languages.

Solution to Problem

A spoken dialog device according to a first aspect of the present invention is a spoken dialog device that includes: a receiving unit that detects a voice section from a start point to an end point of an input speech that is spoken in any of two or more different languages, and acquires speech data corresponding to the voice section; a language identifier acquisition unit that acquires a language identifier that identifies a language in which the input speech was spoken; a speech recognition unit that generates a text resulting from speech recognition, based on the input speech and the language identifier; a dialog control unit to which a text resulting from speech recognition and a language identifier are input, and that generates a different output sentence depending on a language identifier, while maintaining dialog history even when the language identifier is different from the previous language identifier; a speech synthesizing unit that generates a speech waveform based on an output sentence and a language identifier; and a speech output unit that outputs a speech that is based on a speech waveform acquired by the speech synthesizing unit.

With such a configuration, it is possible to return a response that is suitable for a user by identifying the language used by the user.

A spoken dialog device according to a second aspect of the present invention is the spoken dialog device according to the first aspect of the invention, further including: a dialog structure information storage unit configured to store dialog structure information that includes one or more pieces of dialog link information indicating links between dialogs and each including a first dialog action tag that abstracts a speech input by a first speaker, and a second dialog action tag that abstracts an output speech output by a second speaker; and an output sentence information storage unit configured to store output speech information that includes a second dialog action tag and one or more sentences, wherein the dialog control unit includes: a first dialog action tag acquisition subunit that uses a character string acquired by the speech recognition subunit, to acquire, from the dialog structure information storage unit, a first dialog action tag corresponding to the character string; a second dialog action tag acquisition subunit that acquires one second dialog action tag out of one or more second dialog action tags corresponding to the first dialog action tag acquired by the first dialog action tag acquisition subunit; a sentence acquisition subunit that acquires, from the output sentence information storage unit, a sentence corresponding to the second dialog action tag acquired by the second dialog action tag acquisition subunit; and a sentence changing unit that changes the sentence acquired by the sentence acquisition unit according to the language identifier acquired by the language identifier acquisition unit, and acquires the sentence thus changed.

With such a configuration, it is possible to return a response that is suitable for a user by identifying the language used by the user.

A spoken dialog device according to a third aspect of the present invention is the spoken dialog device according to the first aspect of the invention, further including: a dialog structure information storage unit configured to store dialog structure information that includes one or more pieces of dialog link information indicating links between dialogs and each including a first dialog action tag that abstracts a speech input by a first speaker, and a second dialog action tag that abstracts an output speech output by a second speaker, the dialog structure information including two or more second dialog action tags that correspond to a language identifier and that are linked to a first dialog action tag; and an output sentence information storage unit configured to store output speech information that includes a second dialog action tag and one or more sentences, wherein the dialog control unit includes: a first dialog action tag acquisition subunit that uses a character string acquired by the speech recognition subunit, to acquire, from the dialog structure information storage unit, a first dialog action tag corresponding to the character string; a second dialog action tag acquisition subunit that acquires one second dialog action tag that corresponds to the language identifier acquired by the language identifier acquisition unit, out of one or more second dialog action tags corresponding to the first dialog action tag acquired by the first dialog action tag acquisition subunit; and a sentence acquisition subunit that acquires, from the output sentence information storage unit, a sentence corresponding to the second dialog action tag acquired by the second dialog action tag acquisition subunit.

With such a configuration, it is possible to return a response that is suitable for a user by identifying the language used by the user.

A server device according to a fourth aspect of the present invention is a server device that includes: a receiving unit that receives a speech input by a first speaker from a first terminal, detects a voice section from a start point to an end point of the input speech, and acquires speech data corresponding to the voice section; a speech recognition unit that performs speech recognition on the input speech to acquire a character string; an output destination determining unit that determines an output destination of information that is based on the input speech; a transmitting unit that, if the output destination determined by the output destination determining unit is a second terminal, transmits the information that is based on the input speech to the second terminal, and if the output destination determined by the output destination determining unit is a spoken dialog device, transmits the character string acquired by the speech recognition unit to the spoken dialog device; a response receiving unit that receives a response corresponding to the character string, from the spoken dialog device; and a response transmitting unit that transmits a response received by the response receiving unit to the first terminal and the second terminal.

With such a configuration, even in a case where two or more users who speak different languages are located in remote places, the users can have dialogs by appropriately employing a spoken dialog device in a videophone, a video conference system, or the like.

A server device according to a fifth aspect of the present invention is the server device according to the fourth aspect of the invention, wherein the output destination determining unit determines the output destination of the information that is based on the input speech, based on one or more terms included in the character string acquired by the speech recognition unit.

With such a configuration, even in a case where two or more users who speak different languages are located in remote places, the users can have dialogs by appropriately employing a spoken dialog device in a videophone, a video conference system, or the like.

A server device according to a sixth aspect of the present invention is the server device according to the fourth aspect of the invention, wherein the output destination determining unit determines the output destination of the information that is based on the input speech, in response to a user instruction received from the first terminal.

With such a configuration, even in a case where two or more users who speak different languages are located in remote places, the users can have dialogs with users or devices by appropriately employing a spoken dialog device in a videophone, a video conference system, or the like.

Advantageous Effects of Invention

A spoken dialog device according to the present invention is capable of appropriately support spoken dialog that is carried out in multiple languages.

BRIEF DESCRIPTION OF DRAWINGS

FIG. 8 is a diagram showing a dialog structure information management table according to the embodiment.

FIG. 10 is a diagram showing a sentence dialog action information management table according to the embodiment.

FIG. 11 is a diagram showing an output sentence information management table according to the embodiment.

FIG. 12 is a diagram showing a keyword management table according to the embodiment.

FIG. 13 is a diagram showing an output sentence change information management table according to the embodiment.

FIG. 17 is a diagram showing a dialog structure information management table according to the embodiment.

FIG. 19 is a diagram showing an output sentence information management table according to the embodiment.

DESCRIPTION OF EMBODIMENTS

Figure 1:
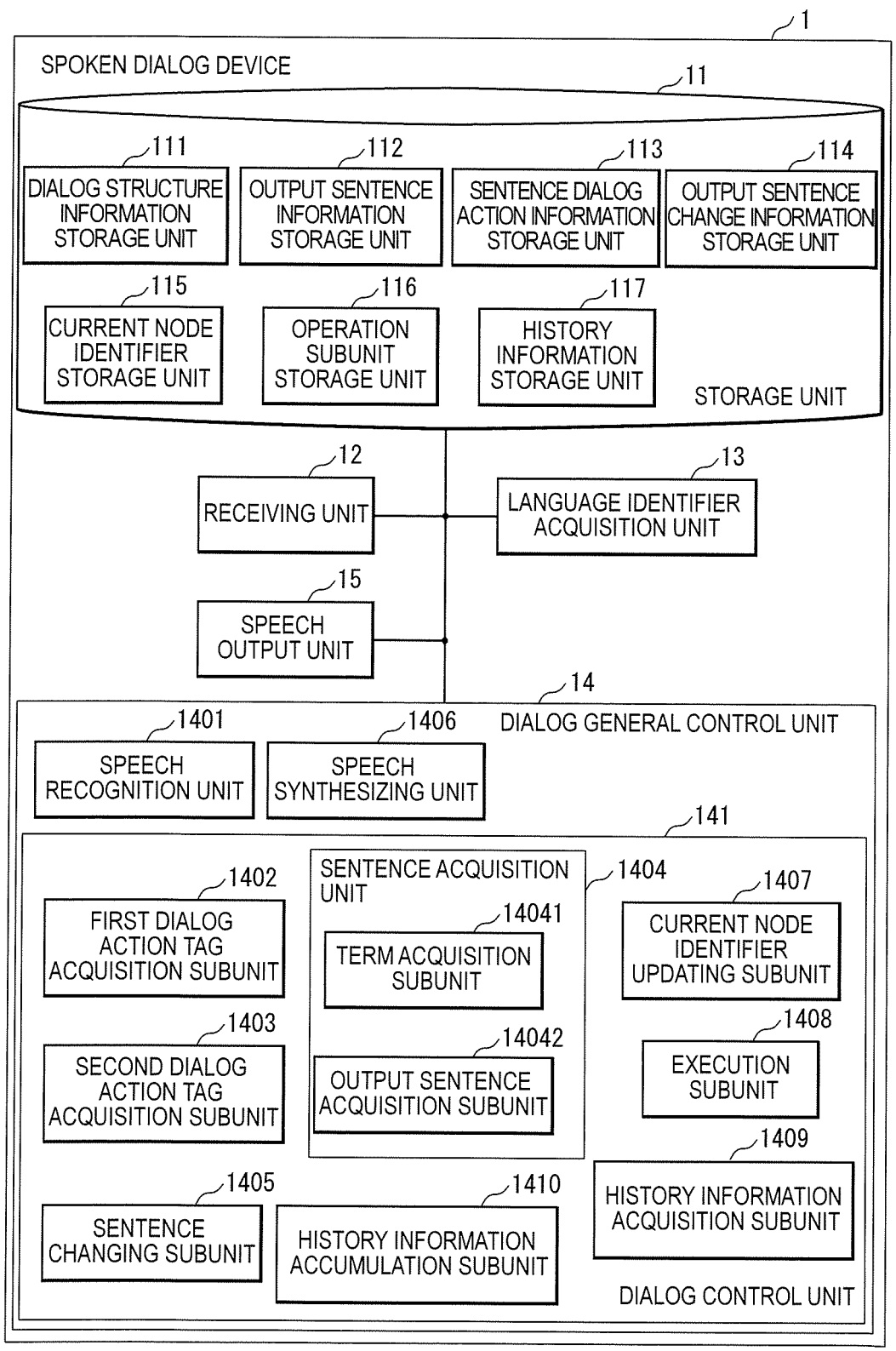
FIG. 1 is a block diagram for a spoken dialog device according to a first embodiment of the present invention.

The following describes embodiments of a spoken dialog device and so on with reference to the drawings. Constituent elements that are assigned the same reference numerals perform the same operations, and therefore redundant descriptions thereof may be omitted.

First Embodiment

The present embodiment describes a spoken dialog device that, in a case where speeches in multiple languages coexist, generates a spoken dialog sentence while taking over history of dialog carried out in a different language. The present embodiment also describes a spoken dialog device that generates a different dialog sentence for each language. Speeches may be analog data or digital data.

The present embodiment also describes a spoken dialog device that realizes cross-lingual dialog, using dialog structure information and information regarding a sentence corresponding to a dialog action tag.

The present embodiment also describes a spoken dialog device that is capable of outputting a dialog sentence that matches the subject appearing in a dialog.

Dialog structure information described in the present embodiment has a structure of a finite-state transducer (FST) or a weighted finite-state transducer (WFST).

The present embodiment also describes a dialog device that accumulates history information, which is information regarding dialogs that have been carried out, and using the history information, outputs a sentence that matches a user. Here, matching a user means that a sentence regarding a subject that is regarded as negative by the user or a sentence regarding a subject that has already appeared in dialog is not to be output as a dialog sentence. Note that a subject is a keyword, which will be described below, and is a noun (or a noun phrase) in a sentence, for example.

FIG. 1 is a block diagram for a spoken dialog device 1 according to the present embodiment. The spoken dialog device 1 includes a storage unit 11, a receiving unit 12, a language identifier acquisition unit 13, a dialog general control unit 14, and a speech output unit 15. The storage unit 11 includes a dialog structure information storage unit 111, an output sentence information storage unit 112, a current node identifier storage unit 115, an operation subunit storage unit 116, a history information storage unit 117, a sentence dialog action information storage unit 113, and an output sentence change information storage unit 114. The dialog general control unit 14 includes a speech recognition unit 1401, a dialog control unit 141, and a speech synthesizing unit 1406. The dialog control unit 141 includes a first dialog action tag acquisition subunit 1402, a second dialog action tag acquisition subunit 1403, a sentence acquisition subunit 1404, a sentence changing subunit 1405, a current node identifier updating subunit 1407, an execution subunit 1408, a history information acquisition subunit 1409, and a history information accumulation subunit 1410. The sentence acquisition subunit 1404 includes a term acquisition subunit 14041 and an output sentence acquisition subunit 14042.

The storage unit 11 included in the spoken dialog device 1 is configured to store various kinds of information. Examples of various kinds of information include dialog structure information described below, output speech information describe below, a current node identifier described below, an operation subunit described below, history information described below, sentence dialog action information described below, and output sentence change information described below.

The dialog structure information storage unit 111 is configured to store one or more pieces of dialog structure information. Dialog structure information is information indicating links between dialogs. Dialog structure information includes one or more pieces of dialog link information. Dialog link information includes a first dialog action tag that abstracts a speech input by a first speaker (typically, a user), and a second dialog action tag that abstracts an output speech output by a second speaker (typically, the spoken dialog device 1). Here, the first speaker is, for example, a user of the spoken dialog device 1. The second speaker is a virtual speaker in the spoken dialog device 1. One of the first dialog action tag and the second dialog action tag may be empty ("eps" described below). Abstracting an input speech or an output speech means classifying the input speech or the output speech into a type, based on the significance or meaning of a sentence included in the input speech or the output speech. Classifying an input speech or an output speech into a type means determining one type out of multiple types, for the input speech or the output speech. A dialog action tag abstracted from an input speech or an output speech is information indicating a type of a dialog action, and examples thereof include "q.spot", "q.weather", "q.how-to-take", "q.cost", "thanks", and so on. A dialog action tag "q.spot" represents a question about a sightseeing place, "q.weather" represents a question about today's weather, "q.how-to-take" is a question about how to get to a destination, "q.cost" is a question about the amount of money required to get to a destination, and "thanks" represents gratitude. Typically, a speech output from the second speaker is, for example, a speech responding to a speech input by the first speaker. Dialog link information may include a starting node identifier, an ending node identifier, a first dialog action tag, and a second dialog action tag. Preferably, the dialog link information also includes weight information that is information indicating the probability of a transition occurring from a node identified by the starting node identifier and a node identified by the ending node identifier. Preferably, dialog link information also includes an operation identifier that is information indicating an operation. Dialog link information includes the staring node identifier and the ending node identifier, and may also include one or more pieces of information among the first dialog action tag, the second dialog action tag, and the operation identifier. The operation identifier is, for example, a function name, a method name, or an execution module name. Here, a node represents a conceptual dialog state. Note that the starting node identifier is information that identifies a node that indicates the start point of a dialog. Similarly, the ending node identifier is information that identifies a node that indicates the end point of a dialog. The starting node identifier and the ending node identifier represent that one dialog is complete. In other words, a series of nodes that are coupled to one another from a node indicated by the starting node identifier to a node indicated by the ending node identifier represent a series of speeches included in one dialog (for example, pairs each consisting of a question and an answer) appearing in one conversation. Note that information indicating links between dialogs may be information indicating links using a starting node identifier included in dialog link information and an ending node identifier included in dialog link information. Furthermore, information indicating links between dialogs may be information that indicates the links by linking pieces of dialog link information to each other using directed links. There are several types of operation identifiers, such as an operation identifier of pre-processing, which is performed on a sentence input by the first speaker, an operation identifier of post-processing, which is performed on a sentence output by the second speaker, and an operation identifier of other general processing. Furthermore, each operation identifier may be applied to a different sentence or different information may.

The output sentence information storage unit 112 is configured to store one or more pieces of output sentence information. Output sentence information is information regarding a sentence included in an output speech (hereinafter referred to as "an output sentence". Output sentence information includes a second dialog action tag and one or more sentences. Output sentence information may include a second dialog action tag, a term, and one or more sentences. Also, one or more sentences included in output sentence information may include sentences written in multiple languages and having the same meaning. Also, the output sentence information storage unit 112 may hold a keyword management table. A keyword management table is a set of pieces of information that is used to search for an output sentence or constitute an output sentence. Details will be described below.

The current node identifier storage unit 115 is configured to store a current node identifier that identifies a node that indicates the state of a current dialog. Typically, a node identifier (e.g. "0") indicating the start point of a dialog is first stored in the current node identifier storage unit 115.

One or more operation subunits are stored in the operation subunit storage unit 116. An operation subunit perform operations corresponding to an operation identifier. An operation subunit is, for example, a program, an execution module, a function, a method, or a processing circuit that is realized using hardware. An operation subunit performs an operation such as speech recognition, speech synthesis, machine translation, history accumulation, a tourist information search, scheduling, a web search, a weather forecast search, a restaurant search, or a ticket booking.

The history information storage unit 117 is configured to store history information, which is information regarding dialog history. History information is, for example, information included in dialog sentences that have already appeared, and is, for example, an already-used term, which is a term that has been already used in a conversation.

The sentence dialog action information storage unit 113 stores sentence dialog action information. Sentence dialog action information is information that is used by the first dialog action tag acquisition subunit 1402 to acquire a first dialog action tag from a text acquired by the speech recognition unit 1401. Sentence dialog action information is information including, for example, information showing a first dialog action tag and a sentence, a first dialog action tag and a phrase, or a first dialog action tag and a sentence structure.

One or more pieces of output sentence change information are stored in the output sentence change information storage unit 114. Output sentence change information is information that is used to change an output sentence. Output sentence change information is used by the sentence changing subunit 1405 to change a sentence. Output sentence change information is information that includes, for example, a language condition, a change range, and a change content. Here, a language condition is a condition regarding a language identifier acquired by the language identifier acquisition unit 13. A language condition may be, for example, a condition "a language identifier acquired by the language identifier acquisition unit 13 is one specific language identifier", "a language identifier acquired by the language identifier 13 is one of multiple language identifiers", or "a language identifier acquired by the language identifier 13 is a language identifier other than one specific language identifier". A change range is information specifying a portion, which is to be changed, of an output sentence. A change range may be any information as long as it specifies a portion of an output sentence, and may be a character string, a word, a compound word, a phrase, a clause, or the entirety of a sentence. A change range may be a pattern of a regular expression or the like. A change content is information regarding changing processing. A change content is information showing a specific content of a change, such as "deletion of a change range" or "replacement of a change range with a specified text", for example. A change content is, for example, deletion, addition, or replacement. When a change content indicates addition or replacement, a text that is used to perform addition or replacement is also specified. Furthermore, when a change content indicates addition, typically, a place where a text is to be added is also specified. Here, a text that is used to perform addition or replacement may be a specific character string. Also, a text that is used to perform addition or replacement may include a function that uses a value included in a change range, such as "(a numerical value in units of Japanese Yen, converted from a numeric value included in a change range in units of Chinese yuan at today's exchange rate) Yen".

The receiving unit 12 detects, from audio data input from a microphone or the like, a section (a voice section) that is presumed to be voice provided by a user to a spoken dialog system, and transmits audio data between the start point and the end point of the voice section, to the speech recognition unit 1401. Hereinafter, a speaker who has provided an input speech is referred to as the first speaker. In other words, the receiving unit 12 receives an input speech from the first speaker. Preferably, a unit that detects a voice section employs a known technology called Voice Activity Detection (VAD). Alternatively, the device may be equipped with a push button, and only when a user provides a speech while pressing the button for a period of time, a section of audio data corresponding to the period of time may be transmitted to the speech recognition unit 1401. Alternatively, the device may be equipped with a camera, and employ a well-known technology through which a voice section is detected by acquiring an image of the face of a user and detecting the shape and movement of lips in the image of the face. Alternatively, an instruction or information other than an input speech (such as an instruction to start up the spoken dialog device 1) may be received. Typically, an input means for inputting speech is a microphone, but may be any means for inputting speech. The receiving unit 12 can be realized as a device driver for an input unit such as a microphone, software for controlling a menu screen, or the like.

The language identifier acquisition unit 13 acquires a language identifier of an input speech received by the receiving unit 12. A language identifier is information that identifies a language. A language identifier may be any information as long as it can identify a language. For example, a language identifier corresponding to Japanese may be "ja" or "Japanese". A unit that identifies a spoken language may employ any method for identifying a spoken language, such as a method based on an i-vector (N. Dehak, P. A. Torres-Carrasquillo, D. Reynolds, and R. Dehak, "Language recognition via ivectors and dimensionality reduction", in Proc. INTERSPEECH, August 2011, pp. 857-860) or a method based on deep learning (J. Gonzalez-Dominguez, I. Lopez-Moreno, P. J. Moreno, and J. Gonzalez-Rodriguez, "Frame-by-frame language identification in short utterances using deep neural networks", Neural Netw., vol. 64, pp. 49-58, April 2015). Processing that is performed by the language identifier acquisition unit 13 is based on well-known technology, and therefore a detailed description thereof is omitted.

The speech recognition unit 1401 performs speech recognition on a speech input by the first speaker and received by the receiving unit 12, and acquires a text. Typically, the speech recognition unit 1401 acquires a text resulting from speech recognition according to the language identifier acquired by the language identifier acquisition unit 13. The speech recognition unit 1401 may be any means as long as it can convert a speech into a text corresponding to the speech. For example, a speech recognizer may be provided for each language, and the speech recognition unit 1401 may recognize a speech using a speech recognizer corresponding to the language identifier acquired by the language identifier acquisition unit 13. Alternatively, the speech recognition unit 1401 may be a speech recognizer that supports multiple languages. Speech recognition technology employed by the speech recognition unit 1401 is a well-known technology, ant a description thereof is omitted. Note that performing speech recognition processing on a speech input by the first speaker and received by the receiving unit 12 means performing speech recognition on speech data received by the receiving unit 12.

The dialog control unit 141 generates a sentence that is to be output from the second speaker, based on the text resulting from speech recognition, acquired by the speech recognition unit 1401, and the language identifier acquired by the language identifier acquisition unit 13. Generating a sentence that is to be output from the second speaker is a concept including selecting or reading out an output sentence, for example. It is preferable that the dialog control unit 141 acquires a different output speech when the language identifier acquired by the language identifier acquisition unit 13 is different, even if the speech input by the first speaker is the same. In such a case, an output sentence generated by the dialog control unit 141 is, for example, a sentence converted from a response to a speech input by the first speaker, by the sentence changing subunit 1405, based on a language used by the first speaker. For example, in a case where the first speaker asks about geometric information regarding Japan, if the answer includes "Hokkaido" and the language used by the first speaker is not Japanese, adding supplemental information regarding "Hokkaido" is more helpful for the first speaker. This is because the first speaker may not be familiar with the geography of Japanese. Here, supplemental information is, for example, information showing that "Hokkaido is located in the northern part of Japan". However, if the language used by the first speaker is Japanese, the first speaker may feel that such supplemental information is redundant. Therefore, it is better to omit such information Also, for example, in a case where a spoken dialog device that searches for restaurants and provides guidance is used, tastes in food may differ depending on the nationality of the speaker, and furthermore, it is possible to assume that tastes in food can be deduced to some extent based on the language input by the first speaker. In a specific example, if the first speaker provides an output sentence meaning "Where is Gion?" to the spoken dialog device 1, and thereafter provides an output sentence meaning "Tell me some restaurants around there", it may be better for the spoken dialog device 1 to change the content of a response, i.e. restaurants to be introduced, depending on whether the language used by the first speaker is Japanese, Chinese, or Arabic.

The first dialog action tag acquisition subunit 1402 acquires, from a text corresponding to the speech recognized by the speech recognition unit 1401, a first dialog action tag corresponding to the text. The first dialog action tag acquisition subunit 1402 may be any subunit as long as it can convert a text to a first dialog action tag corresponding to the text. For example, a converter may be prepared for each language, and the first dialog action tag acquisition subunit 1402 may convert a text to a first dialog action tag using a converter corresponding to the language identifier acquired by the language identifier acquisition unit 13. Alternatively, the first dialog action tag acquisition subunit 1402 may be a converter that supports multiple languages. Hereinafter, a text acquired by the speech recognition unit 1401, from a speech input by the first speaker and received by the receiving unit 12, is referred to as an input speech text. The first dialog action tag acquisition subunit 1402 performs, for example, natural language processing on an input speech text, to acquire a first dialog action tag. The first dialog action tag acquisition subunit 1402 performs, for example, a search on sentence dialog action information stored in the sentence dialog action information storage unit 113, to acquire a dialog action tag that constitutes a pair with the input speech text. Also, the first dialog action tag acquisition subunit 1402 performs, for example, morphological analysis on the input speech text, to acquire a dialog action tag that constitutes a pair with a sentence that includes some morphemes (e.g. "よろしいですか？", which is morphemes included in a sentence "京都でよろしいでしょうか"). Also, the first dialog action tag acquisition subunit 1402 performs, for example, pattern matching between a portion of the input speech text and sentence dialog action information, to acquire a dialog action tag that is included in matched (or partially matched) sentence dialog action information. A dialog action tag thus acquired is a first dialog action tag.

The second dialog action tag acquisition subunit 1403 acquires one second dialog action tag corresponding to the first dialog action tag acquired by the first dialog action tag acquisition subunit 1402. It is also preferable that the second dialog action tag acquisition subunit 1403 acquires one second dialog action tag that corresponds to a starting node identifier that matches the current node identifier stored in the current node identifier storage unit 115, and that corresponds to the first dialog action tag acquired by the first dialog action tag acquisition subunit 1402. It is preferable that, when there are two or more candidate second dialog action tags that can be acquired, the second dialog action tag acquisition subunit 1403 use pieces of weight information to select a second dialog action tag that constitutes a pair with a piece of weight information that indicates a relatively high transition probability. When there are two or more candidate second dialog action tags that can be acquired, for example, the second dialog action tag acquisition subunit 1403 may use a piece of weight information corresponding to a starting node identifier that is two or more nodes ahead of the node identified by the current node identifier to apply a DP (Dynamic Programming) algorithm, and use pieces of accumulated weight information, which is information indicating the total weight accumulated through a route, to acquire a second dialog action tag included in a route corresponding to a piece of accumulated weight information indicating the highest transition probability. Furthermore, the second dialog action tag acquisition subunit 1403 may acquire a second dialog action tag corresponding to the initial node (e.g. a node corresponding to the starting node identifier "0" described below) at the beginning of a dialog.

The sentence acquisition subunit 1404 acquires, from the output sentence information storage unit 112, a sentence corresponding to the second dialog action tag acquired by the second dialog action tag acquisition subunit 1403. Also, for example, the sentence acquisition subunit 1404 acquires one or more terms from a text (an input speech text) corresponding to the input speech recognized by the speech recognition unit 1401, and acquires a sentence from the output sentence information storage unit 112, using the one or more terms and the second dialog action tag. It is also preferable that the sentence acquisition subunit 1404 uses history information to acquire, from the output sentence information storage unit 112, a sentence corresponding to the second dialog action tag acquired by the second dialog action tag acquisition subunit 1403. For example, the sentence acquisition subunit 1404 acquires, from the output sentence information storage unit 112, a sentence corresponding to the second dialog action tag acquired by the second dialog action tag acquisition subunit 1403. The sentence acquisition subunit 1404 may select and acquire one or more sentences from among multiple sentences, or acquire all of two or more sentences.

The term acquisition subunit 14041 acquires a term from a text (an input speech text) corresponding to the input speech recognized by the speech recognition unit 1401. The term acquisition subunit 14041 performs, for example, morphological analysis on the input speech text, to acquire a noun and so on that constitute the input speech text.

The output sentence acquisition subunit 14042 acquires, from the output sentence information storage unit 112, a sentence corresponding to the term acquired by the term acquisition subunit 14041 and to the second dialog action tag acquired by the second dialog action tag acquisition subunit 1403. It is preferable that the output sentence acquisition subunit 14042 uses history information to acquire, from the output sentence information storage unit 112, a sentence corresponding to the second dialog action tag acquired by the second dialog action tag acquisition subunit 1403.

The sentence changing subunit 1405 changes the sentence acquired by the sentence acquisition subunit 1404 according to the language identifier acquired by the language identifier acquisition unit 13, and acquires the sentence thus changed. The sentence changing subunit 1405 may perform pattern matching between the output sentence acquired by the sentence acquisition subunit 1404 and the output sentence change information stored in the output sentence change information storage unit 114, and acquire an output sentence based on matched (or partially matched) output sentence change information.

The speech synthesizing unit 1406 acquires the speech waveform of the output sentence acquired by the sentence changing subunit 1405. Typically, the speech synthesizing unit 1406 acquires a speech waveform corresponding to the output sentence through speech synthesizing processing. Speech synthesizing processing is a well-known technology, and therefore a description thereof is omitted. The speech synthesizing unit 1406 may be any unit as long as it can acquire, from a text, a speech waveform corresponding to the text. For example, a synthesizer may be provided for each language, and the speech synthesizing unit may acquire a speech waveform using a synthesizer corresponding to the language identifier acquired by the language identifier acquisition unit 13. The speech synthesizing unit 1406 may be a synthesizer that supports multiple languages.

The current node identifier updating subunit 1407 replaces the current node identifier stored in the current node identifier storage unit 115 with an ending node identifier that constitutes a pair with the second dialog action tag corresponding to the output sentence acquired by the sentence acquisition subunit 1404.

The execution subunit 1408 acquires an operation identifier corresponding to the second dialog action tag selected by the second dialog action tag acquisition subunit 1403, and causes an operation subunit corresponding to the operation identifier to operate. The execution subunit 1408 may cause an operation subunit corresponding to a predetermined operation identifier to operate in response to a speech input by the first speaker and received by the receiving unit 12. Such processing is referred to as pre-processing as appropriate. The execution subunit 1408 performs processing such as function call processing, method execution processing, and execution module activation processing.

The history information acquisition subunit 1409 acquires history information from a speech input by the first speaker and received by the receiving unit 12. For example, the history information acquisition subunit 1409 acquires, as history information, a noun and so on from the text acquired by the speech recognition unit from the speech input by the first speaker. History information may be acquired for each speaker. Alternatively, speakers may be classified into groups according to languages used by them, and history information may be acquired for each group. History information may also be acquired without classifying speakers or languages used by them.

The history information accumulation subunit 1410 accumulates the history information acquired by the history information acquisition subunit 1409 in the history information storage unit 117.

The speech output unit 15 outputs a speech waveform generated by the speech synthesizing unit 1406. Note that the output of a speech waveform mentioned here can be regarded as the output of audio corresponding to the waveform. If the language identifier acquisition unit 13 has acquired a language identifier, the speech output unit 15 may output an output sentence only in the language corresponding to the language identifier. If the speech output unit 15 receives an output sentence generated by the dialog control unit 141 in addition to a speech waveform generated by the speech synthesizing unit 1406, the speech output unit 15 may output the output sentence at the same time as the speech waveform. Outputting is a concept including outputting a speech from a loudspeaker or the like, displaying on a display, projection using a projector, printing using a printer, transmitting to an external device, storing on a recording medium, handing over the result of processing to another processing device or another program, and so on. The speech output unit 15 may or may not include an output device such as a loudspeaker or a display. The speech output unit 15 can be realized using, for example, driver software for an output device, or driver software for an output device and the output device.

It is preferable that the storage unit 11, the dialog structure information storage unit 111, the output sentence information storage unit 112, the current node identifier storage unit 115, the operation subunit storage unit 116, the history information storage unit 117, the sentence dialog action information storage unit 113, and the output sentence change information storage unit 114 are realized using a non-volatile recording medium. However, they can be realized using a volatile recording medium. A process through which various kinds of information are stored in the storage unit 11 and so on is not limited. For example, information may be stored in the storage unit 11 and so on via a recording medium, or information transmitted via a communication network or the like may be stored in the dialog structure information storage unit 111 and so on, or information input via an input device may be stored in the storage unit 11 and so on.

The language identifier acquisition unit 13, the dialog general control unit 14, the speech recognition unit 1401, the dialog control unit 141, the speech synthesizing unit 1406, the first dialog action tag acquisition subunit 1402, the second dialog action tag acquisition subunit 1403, the sentence acquisition subunit 1404, the sentence changing subunit 1405, the current node identifier updating subunit 1407, the execution subunit 1408, the history information acquisition subunit 1409, the history information accumulation subunit 1410, the term acquisition subunit 14041, and the output sentence acquisition subunit 14042 can typically be realized using a MPU, a memory, and so on. Processing procedures that are performed by the language identifier acquisition unit 13 and so on are typically realized using software, and the software is recorded on a recording medium such as a ROM. However, they may be realized using hardware (dedicated circuits).

Next, operations of the spoken dialog device 1 will be described with reference to the flowchart shown in FIG. 2.

Step S201: The receiving unit 12 detects, from audio data input from a microphone or the like, a section (a voice section) that is presumed to be voice provided by a user to the spoken dialog system. If a voice section is detected, processing proceeds to step S202, and if not, processing returns to step S201.

Step S202: The language identifier acquisition unit 13 performs language identification processing on the voice section detected in step S201 to acquire the language identifier of the speech input by the first speaker.

Step S203: The execution subunit 1408 performs pre-processing. Pre-processing is performed to cause an operation subunit corresponding to a predetermined operation identifier to operate in response to the input speech received in step S201. For example, the execution subunit 1408 executes noise reduction to remove noise from the input speech.

Step S204: The speech recognition unit 1401 executes speech recognition on the speech input by the user, to acquire a text corresponding to the speech input by the user.

Step S205: The first dialog action tag acquisition subunit 1402 performs natural language processing on the text acquired in step S204, to acquire a first dialog action tag. Such processing is referred to as first dialog action tag acquisition processing. Details of first dialog action tag acquisition processing will be described with reference to the flowchart shown in FIG. 3.

Step S206: The second dialog action tag acquisition subunit 1403 acquires one second dialog action tag corresponding to the first dialog action tag acquired in step S205. Such processing is referred to as second dialog action tag acquisition processing. Details of second dialog action tag acquisition processing will be described with reference to the flowchart shown in FIG. 4. Note that there may be a case in which a second dialog action tag cannot be acquired in this step.

Step S207: If the dialog general control unit 14 succeeds in acquiring a second dialog action tag in step S206, processing proceeds to step S208, and if not, processing proceeds to step S212. Note that a direct jump to step S212 occurring when a second dialog action tag cannot be acquired means that no output sentence or speech is output. Alternatively, a special symbol representing that the output is "empty" may be output, and thereafter a jump to step S212 may occur.

Step S208: The sentence acquisition subunit 1404 acquires, from the output sentence information storage unit 112, a sentence corresponding to the second dialog action tag acquired in step S206. Such processing is referred to as sentence acquisition processing. Details of sentence acquisition processing will be described with reference to the flowchart shown in FIG. 5.

Step S209: The sentence changing subunit 1405 changes the output sentence acquired in step S208 according to the language identifier acquired in step S202, and acquires an output sentence thus changed. Such processing is referred to as sentence changing processing. Details of sentence changing processing will be described with reference to the flowchart shown in FIG. 6. Note that if no portion of the output sentence acquired in step S208 needs to be changed, the sentence changing subunit 1405 acquires the sentence acquired in step S208 without change.

Step S210: The speech synthesizing unit 1406 generates a speech waveform corresponding to the output sentence acquired in step S209.

Step S211: The speech output unit 15 outputs the speech waveform acquired in step S210. Outputting performed here may be outputting a speech to a loudspeaker or the like of the spoken dialog device 1, or performing processing to pass a speech waveform to another program or the like.

Step S212: The execution subunit 1408 performs so-called post-processing. Details of post-processing will be described with reference to the flowchart shown in FIG. 7. Thereafter, processing returns to step S201. As a result of processing returning to step S201, dialog between the user and the spoken dialog device 1 successively progresses.

Figure 2:
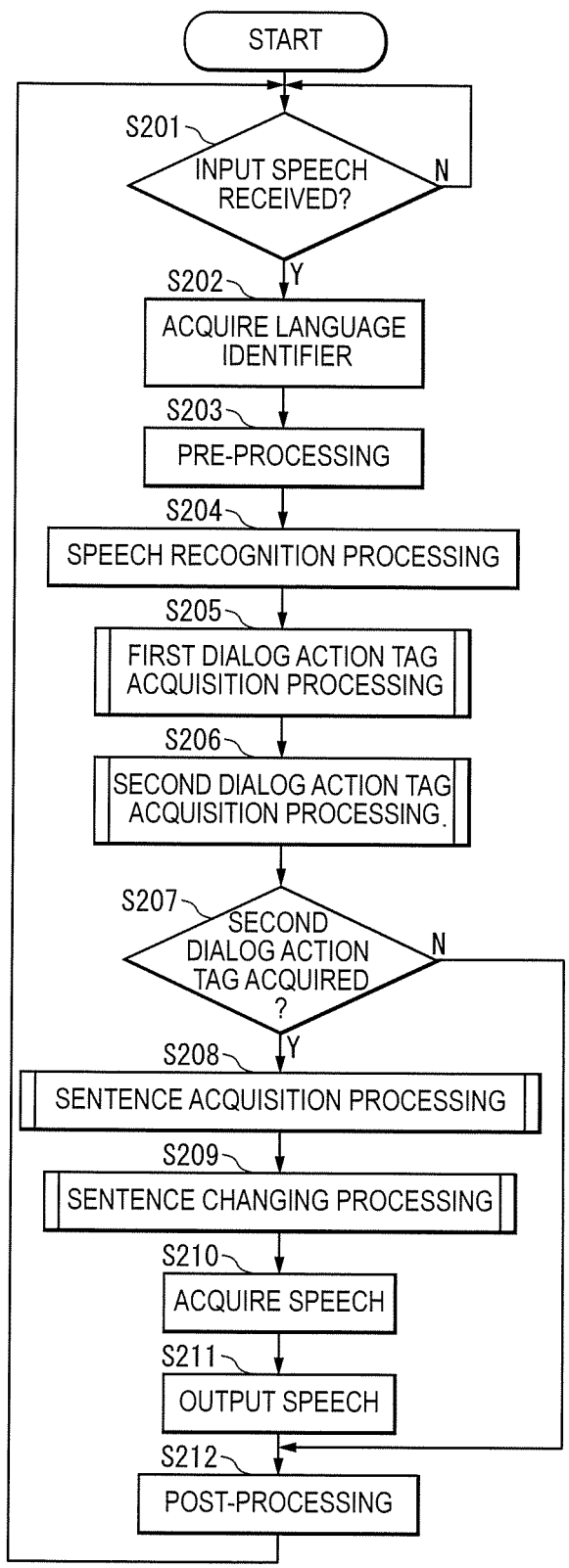
FIG. 2 is a flowchart showing operations of the spoken dialog device according to the embodiment.

Note that pre-processing may be omitted from the flowchart shown in FIG. 2.

In the flowchart shown in FIG. 2, after post-processing has been performed in step S212, processing returns to step S201. However, pieces of dialog link information linked one after another in the dialog structure information storage unit 111 may be processed until processing reaches a node (state) representing that a speech input by the user is received (until processing proceeds to dialog link information representing that a speech input by the user is received). Such processing corresponds to steps S205 to S212. Details thereof will be described in a specific example below.

Also, in the flowchart shown in FIG. 2, processing may be started from step S206.

Also, in the flowchart shown in FIG. 2, processing ends at power off or at an interruption of ending processing.

Figure 3:
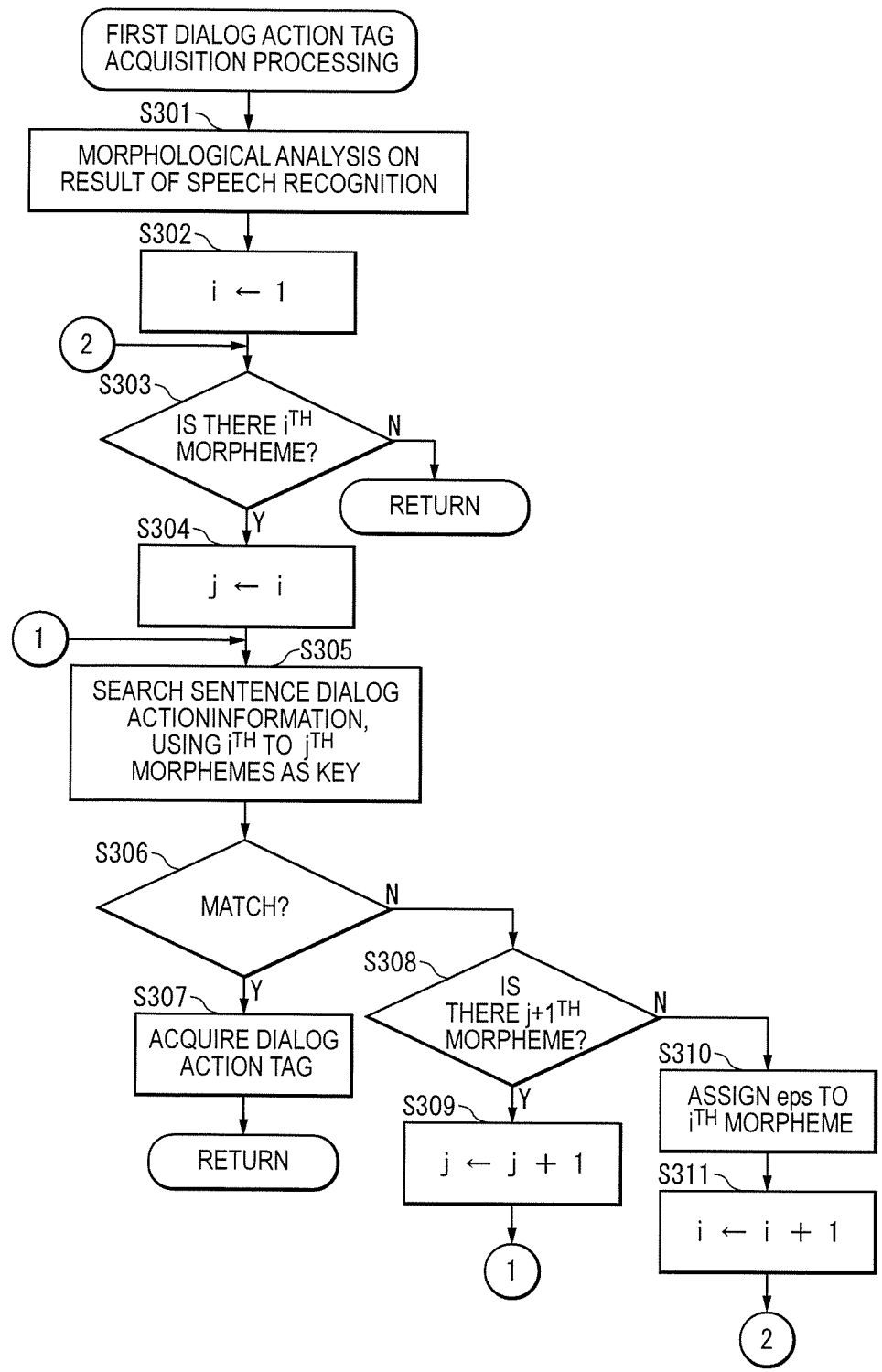
FIG. 3 is a flowchart showing operations for first dialog action tag acquisition processing according to the embodiment.

Next, details of a specific example of first dialog action tag acquisition processing in step S205 will be described with reference to the flowchart shown in FIG. 3.

step S301: The first dialog action tag acquisition subunit 1402 performs morphological analysis on the text acquired in step S204 to acquire a string composed of one or more morphemes.

Step S302: The first dialog action tag acquisition subunit 1402 substitutes 1 for a counter i.

Step S303: The first dialog action tag acquisition subunit 1402 determines whether or not there is an $i^{th}$ morpheme in the string composed of one or more morphemes acquired in step S301. If there is an $i^{th}$ morpheme, processing proceeds to step S304, and if not, processing returns to upper-level processing. It is preferable that, before returning to upper-level processing, the first dialog action tag acquisition subunit 1402 attaches a dialog action tag "eps" to a morpheme to which a dialog action tag is not attached.

Step S304: The first dialog action tag acquisition subunit 1402 substitutes i for a counter j.

Step S305: The first dialog action tag acquisition subunit 1402 searches the sentence dialog action information storage unit 113, using a partial morpheme string as a key. Here, a partial morpheme string is a string consisting of $i^{th}$ to $j^{th}$ morphemes included in the morpheme string acquired in step S301.

Step S306: The first dialog action tag acquisition subunit 1402 determines whether or not any piece of sentence dialog action information stored in the sentence dialog action information storage unit 113 matches the partial morpheme string used as a key. If they match, processing proceeds to step S307, and if not, processing proceeds to step S308. Note that matching may be perfect matching or partial matching. It is preferable that processing is performed such that they match even if there are fluctuations in expression or if they are synonyms. Processing of fluctuations in expression and synonyms belongs to well-known technology, and therefore details thereof are omitted.

Step S307: The first dialog action tag acquisition subunit 1402 acquires a dialog action tag included in the sentence dialog action information that matched the partial morpheme string in step S306, and processing returns to upper-level processing.

Step S308: The first dialog action tag acquisition subunit 1402 determines whether or not there is a $j+1^{th}$ morpheme. If there is a $j+1^{th}$ morpheme, processing proceeds to step S309, and if not, processing proceeds to step S310.

Step S309: The first dialog action tag acquisition subunit 1402 increments the counter j by one, and processing returns to step S305.

Step S310: The first dialog action tag acquisition subunit 1402 adds a dialog action tag "eps" to the $i^{th}$ morpheme.

Step S311: The first dialog action tag acquisition subunit 1402 increments the counter i by one, and processing returns to step S303.

Next, details of second dialog action tag acquisition processing in step S206 will be described with reference to the flowchart shown in FIG. 4.

Step S401: The second dialog action tag acquisition subunit 1403 reads out a current node identifier stored in the current node identifier storage unit 115. Next, the second dialog action tag acquisition subunit 1403 acquires, from the dialog structure information storage unit 111, one or more second dialog action tags that correspond to a starting node identifier that matches the current node identifier and that correspond to the first dialog action tag acquired by the first dialog action tag acquisition subunit 1402.

Step S402: The second dialog action tag acquisition subunit 1403 substitutes 1 for the counter i.

Step S403: The second dialog action tag acquisition subunit 1403 determines whether or not the one or more second dialog action tags acquired in step S401 include a second dialog action tag that constitutes a pair with a piece of weight information that indicates the $i^{th}$ highest transition probability. If there is such a second dialog action tag, processing proceeds to step S404, and if not, processing proceeds to step S407. Note that such determination is performed with reference to dialog structure information stored in the dialog structure information storage unit 111.

Step S404: The second dialog action tag acquisition subunit 1403 acquires a second dialog action tag that constitutes a pair with a piece of weight information indicating the $i^{th}$ highest transition probability, out of the one or more second dialog action tags acquired in step S401, and loads the second dialog action tag to the memory.

Step S405: The second dialog action tag acquisition subunit 1403 determines whether or not a sentence corresponding to the second dialog action tag that constitutes a pair with the piece of weight information indicating the $i^{th}$ highest transition probability has been output (whether or not the second dialog action tag that constitutes a pair with the piece of weight information indicating the $i^{t}$ highest transition probability has been processed). If such a second dialog action tag has been processed, processing proceeds to step S406, and if not, processing proceeds to step S408.

Step S406: The second dialog action tag acquisition subunit 1403 increments the counter i by one, and processing returns to step S403.

Step S407: The second dialog action tag acquisition subunit 1403 determines a default second dialog action tag as an ultimate second dialog action tag. The default second dialog action tag is, for example, "Confirm", with which the spoken dialog device 1 asks for the user's confirmation. Processing returns to upper-level processing. Note that, if processing does not go through step S407, there is no need to store the default second dialog action tag in advance.

Step S408: The second dialog action tag acquisition subunit 1403 determines, as an ultimate second dialog action tag, a second dialog action tag that constitutes a pair with a piece of weight information that indicates the $i^{th}$ highest transition probability, and processing returns to upper-level processing.

Figure 4:
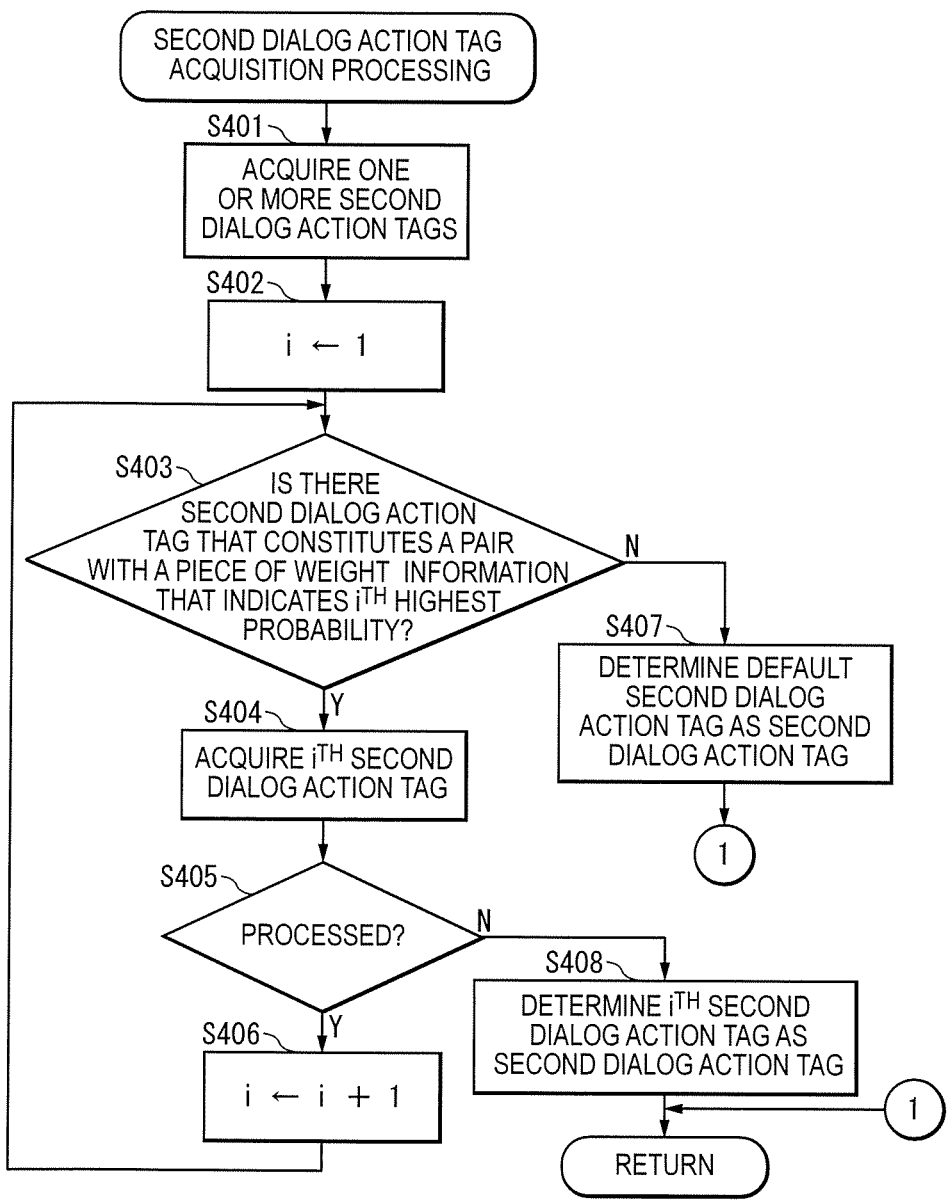
FIG. 4 is a flowchart showing operations for second dialog action tag acquisition processing according to the embodiment.

Note that, in the flowchart shown in FIG. 4, a flag is attached to a second dialog action tag that has already been processed, for example.

Next, details of sentence acquisition processing that is performed in step S208 will be described with reference to the flowchart shown in FIG. 5.

Step S501: The sentence acquisition subunit 1404 acquires the second dialog action tag ultimately determined by the second dialog action tag acquisition subunit 1403.

Step S502: the term acquisition subunit 14041 acquires a term from the input speech text acquired by the speech recognition unit 1401. The term mentioned here is, for example, a noun and so on included in the input speech text. The term acquisition subunit 14041 performs morphological analysis on the input speech text, and extracts a noun and so on that constitute the input speech text.

Note that technology for acquiring a noun and so on from a sentence is a well-known technology, and therefore a detailed description thereof is omitted.

Step S503: The output sentence acquisition subunit 14042 acquires, from the output sentence information storage unit 112, one or more sentences corresponding to the term acquired by the term acquisition subunit 14041 and to the second dialog action tag acquired by the second dialog action tag acquisition subunit 1403.

Step S504: The output sentence acquisition subunit 14042 reads out history information from the history information storage unit 117. At this time, it is preferable that pieces of history information that do not correspond to the speaker of the input speech received in step S201 or the language in which the input speech was spoken are not read out.

Step S505: The output sentence acquisition subunit 14042 extracts a sentence corresponding to a term included in the history information acquired in step S504, from among the one or more sentences acquired in step S503.

Step S506: The output sentence acquisition subunit 14042 acquires one or more sentences from the remaining sentences. At this time, if there is one remaining sentence, the output sentence acquisition subunit 14042 acquires the one sentence. If there are two or more remaining sentences, the output sentence acquisition subunit 14042 may select one sentence, or some or all of the two or more sentences. After the acquisition, processing returns to upper-level processing.

Figure 5:
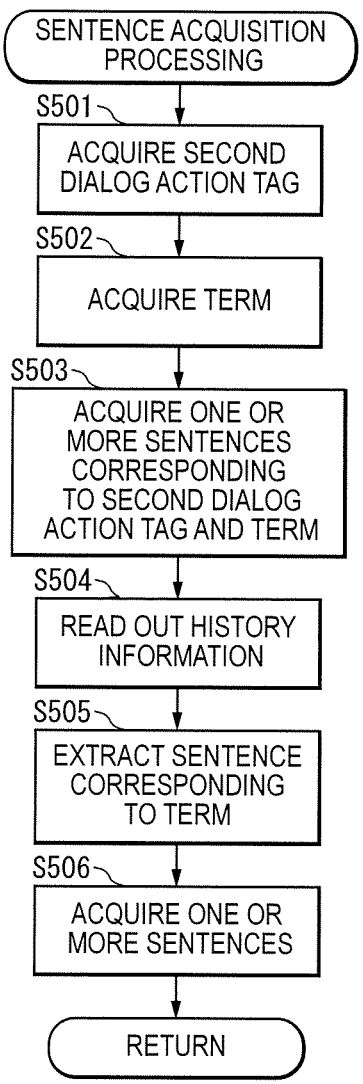
FIG. 5 is a flowchart showing operations for sentence acquisition processing according to the embodiment.

Note that, in the flowchart shown in FIG. 5, there may be no history information. In such a case, the output sentence acquisition subunit 14042 ultimately acquires one sentence or two or more sentences from the one or more sentences acquired in step S503.

Also, in step S502 in the flowchart shown in FIG. 5, it may be unable to acquire a term. In such a case, the output sentence acquisition subunit 14042 acquires, from the output sentence information storage unit 112, one or more sentences corresponding to the second dialog action tag acquired by the second dialog action tag acquisition subunit 1403.

Figure 6:
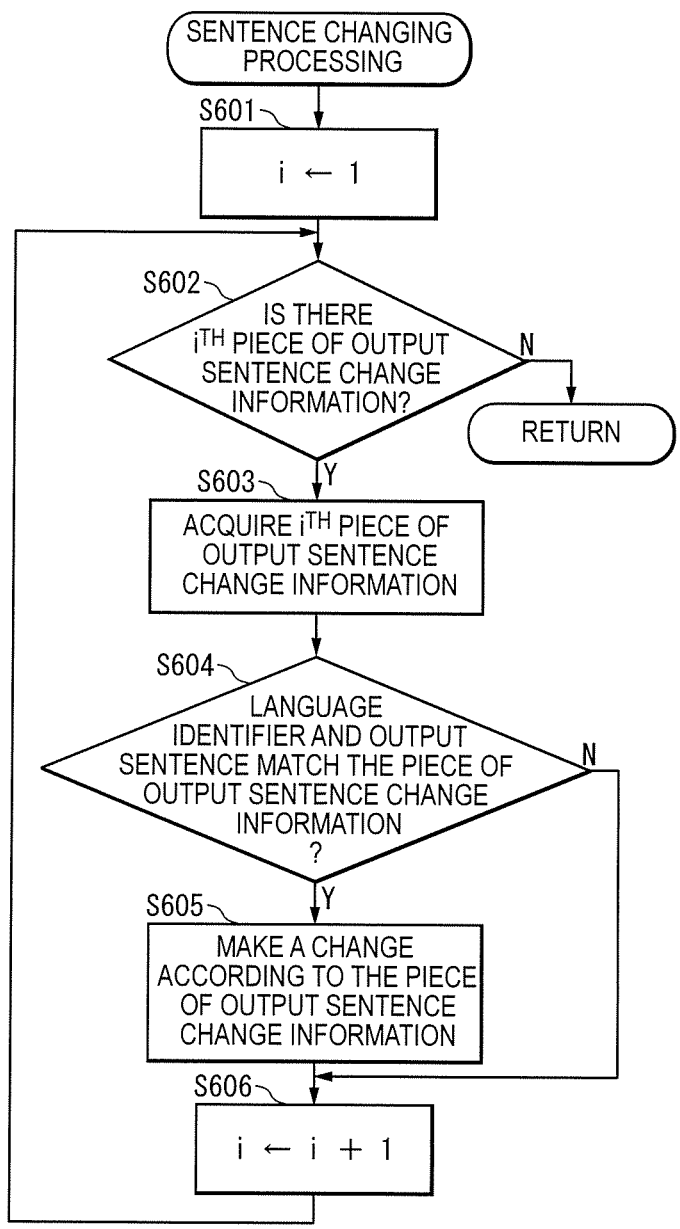
FIG. 6 is a flowchart showing operations for sentence changing processing according to the embodiment.

Next, details of sentence changing processing that is performed in step S209 will be described with reference to the flowchart shown in FIG. 6.

Step S601: The sentence changing subunit 1405 substitutes 1 for the counter i.

Step S602: The sentence changing subunit 1405 determines whether or not there is an $i^{th}$ piece of output sentence change information in the output sentence change information storage unit 114. If there is the $i^{th}$ piece of output sentence change information, processing proceeds to step S603, and if not, processing returns to upper-level processing. Note that, if an output sentence is not acquired in step S208, processing returns to upper-level processing.

Step S603: The sentence changing subunit 1405 acquires the $i^{th}$ piece of output sentence change information from the output sentence change information storage unit 114.

Step S604: The sentence changing subunit 1405 determines whether or not the language identifier acquired in step S202 satisfies the language condition regarding the $i^{th}$ piece of output sentence change information and the output sentence includes a portion indicated by a change range included in the piece of output sentence change information. If the language identifier satisfies the language condition and a portion indicated by a change range is included, processing proceeds to step S605, and otherwise processing proceeds to step S606.

Step S605: The sentence changing subunit 1405 changes the output sentence according to a change content included in the $i^t$ piece of output sentence change information.

Step S606: The sentence changing subunit 1405 increments the counter i by one, and processing returns to step S602.

Figure 7:
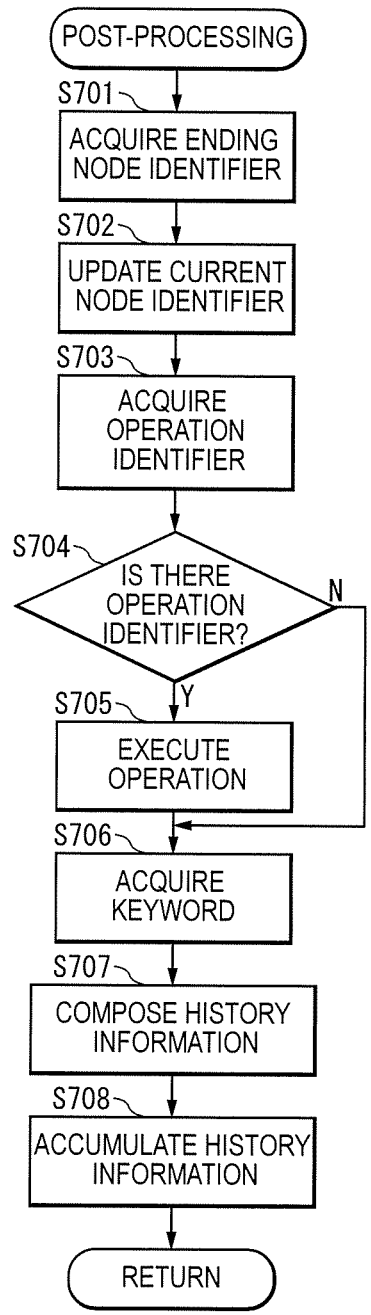
FIG. 7 is a flowchart showing operations for post-processing according to the embodiment.

Next, details of post-processing that is performed in step S212 will be described with reference to the flowchart shown in FIG. 7.

Step S701: The current node identifier updating subunit 1407 acquires, from the dialog structure information storage unit 111, an ending node identifier that constitutes a pair with a second dialog action tag corresponding to the sentence output by the dialog control unit 141, and loads the ending node identifier to the memory.

Step S702: the current node identifier updating subunit 1407 replaces the current node identifier stored in the current node identifier storage unit 115 with the ending node identifier acquired in step S701.

Step S703: The execution subunit 1408 acquires, from the dialog structure information storage unit 111, one or more operation identifiers corresponding to the second dialog action tag selected by the second dialog action tag acquisition subunit 1403.

Step S704: The execution subunit 1408 determines whether or not there are one or more operation identifiers acquired in step S703. If there are one or more operation identifiers, processing proceeds to step S705, and if not, processing proceeds to step S706.

Step S705: The execution subunit 1408 causes an operation subunit corresponding to the one or more operation identifiers acquired in step S703 to operate.

Step S706: the history information acquisition subunit 1409 acquires a keyword from the input speech text acquired by the speech recognition unit 1401. Note that a keyword is, for example, a noun or the like in a sentence. The method for acquiring history information is not limited.

Step S707: The history information acquisition subunit 1409 composes history information, using the acquired keyword and so on.

Step S708: The history information accumulation subunit 1410 accumulates the history information acquired in step S707 in the history information storage unit 117, and processing returns to the upper processing.

The following describes specific operations of the spoken dialog device 1 according to the present embodiment.

Now, the dialog structure information storage unit 111 stores a dialog structure information management table, which is shown in FIG. 8. The dialog structure information management table holds one or more records of dialog link information. Dialog link information has attributes: "ID", "starting node identifier", "ending node identifier", "first dialog action tag", "second dialog action tag", "weight information", and "operation identifier". Note that dialog link information has attribute values of "starting node identifier" and "ending node identifier", and attribute value(s) of one or more attributes out of "first dialog action tag", "second dialog action tag", and "operation identifier". The attribute value of "weight information" is not necessarily present. In FIG. 8, "-" in "first dialog action tag" and "second dialog action tag" represents NULL. Also, if the attribute value of "operation identifier" is not written, it means that "operation identifier" is NULL. Furthermore, although not shown in the figure, the records of dialog link information may have an input-waiting flag indicating that the node is for waiting for a speech to be input from the user. If an input-waiting flag is assigned to a record, the spoken dialog device 1 waits for a speech to be input from the user, after performing processing on the record to which the input-waiting flag is set. In FIG. 8, an input-waiting flag is assigned to records with IDs 1, 4, 6, 7, 9, and 10.

Note that "spot search (user)" in "operation identifier" in the dialog structure information management table shown in FIG. 8 represents processing that is performed to search for a sightseeing place that matches the user corresponding to the language identifier of the input speech. Similarly, "spot search (place)" represents processing that is performed to search for a sightseeing place that matches the current position of the user.

Figure 9:
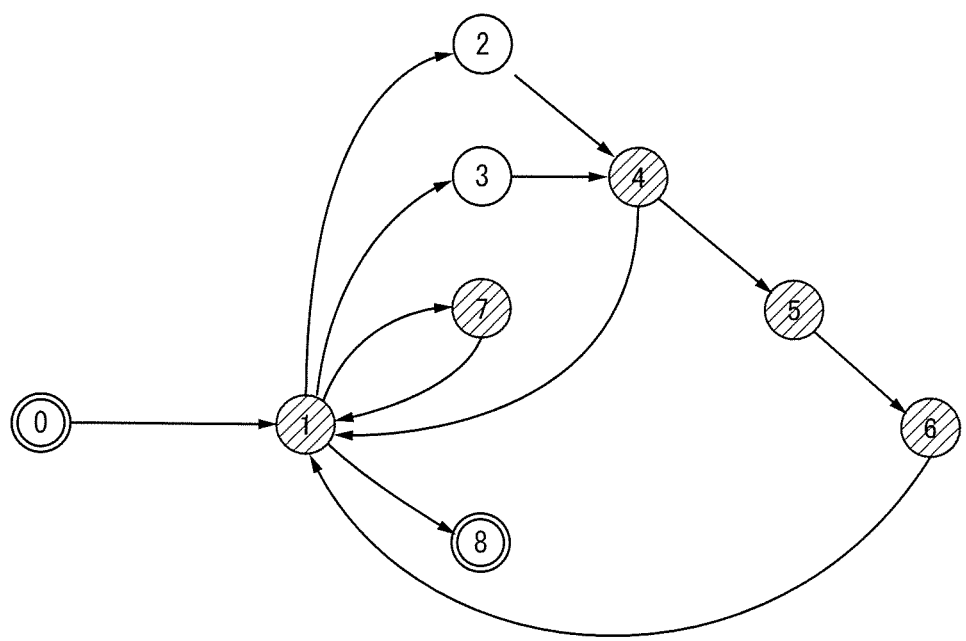
FIG. 9 is a dialog state transition diagram according to the embodiment.

Furthermore, the dialog structure information management table shown in FIG. 8 can be represented using a dialog state transition diagram shown in FIG. 9. The dialog state transition diagram shown in FIG. 9 is so-called WFST. In the dialog state transition diagram shown in FIG. 9, shaded nodes (states) are nodes that are waiting for a sentence to be input from the user. "0" in the double circles is the initial node, which is a node that indicates the start of a dialog. "8" in the double circles is the end node, which is a node that indicates the end of the dialog.

The sentence dialog action information storage unit 113 stores a sentence dialog action information management table, which is shown in FIG. 10. The sentence dialog action information management table includes "ID", "first dialog action tag", and "partial text". If the text acquired by the speech recognition unit 1401 includes a "partial text" in any of the records shown in FIG. 10, the first dialog action tag acquisition subunit 1402 acquires the first dialog action tag of the record.

Also, the output sentence information storage unit 112 stores an output sentence information management table, which is shown in FIG. 11. The output sentence information management table includes "ID" and "output sentence information". "Output sentence information" includes "dialog action tag" and "output sentence" in Japanese, English, and Chinese. Information included in < > in "output sentence" represents that the value of an internal variable is to be substituted therefor. Examples of internal variables include <spot>, which represents the result of spot search, <weather>, which represents the weather, <from>, which represents the starting point, <time>, which represents time, <trans>, which represents a means of transportation, <cost>, which represents the amount of money, and so on.

Also, the output sentence information storage unit 112 holds a keyword management table, which is shown in FIG. 12. The keyword management table is a table that stores pieces of information that can be keywords regarding a task that is to be performed by the spoken dialog device 1 (a certain theme). In FIG. 12, many records that have attributes such as "ranking", "spot", "from", "time", "trans", and "cost" are stored. In the following example, the task that is to be performed by the spoken dialog device 1 is to guide sightseeing in Japan. "Ranking" is information indicating the degree of popularity of a sightseeing spot in Japan. "Spot", "from", "time", "trans", and "cost" are modeled information regarding a spot. "Spot" represents a sightseeing spot. "From" represents a point of departure to the sightseeing spot. "Time" represents how long does it take to travel from the point of departure to the sightseeing spot by the means of transportation described below. "Trans" represents a means of transportation that is used to travel from the point of departure to the sightseeing spot. "Cost" represents how much does it cost to travel from the point of departure to the sightseeing spot by the means of transportation.

As described below, the spoken dialog system needs to know that "京都" in Japanese, "Kyoto" in English, and "京都" in Chinese are keywords corresponding to each other. Similarly, the spoken dialog system needs to know that "飛行機" (Japanese), "airplane" (English), and "飞机" (Chinese) correspond to each other. To fulfill such a need, keywords are written in the corresponding languages in the fields in the table shown in FIG. 12.

The output sentence change information storage unit 114 holds an output sentence change information management table, which is shown in FIG. 13. The output sentence change information management table includes "ID" and "output sentence change information". "Output sentence change information" includes "language condition", "range of change", and "content of change". In "language condition", "Lang=language L" means that the language identifier indicates a language L. Also, "(% d)" is a character string that represents a numerical value, and "yuan_to_yen($1)" represents a function that converts the numerical value, which is defined as a numerical value indicating Chinese yuan, to Japanese yen. "Type=addition" in FIG. 13 means that, if the language in which the output sentence is represented matches the "language condition", the text in "content" is added to the output text, at the position represented by "position". In this figure, if the output text in a language other than Japanese includes a keyword corresponding to "Hokkaido", a sentence that means "Hokkaido is located in the northern part of Japan" is added to the output sentence.

The following describes an implementation example in such a situation, where three users (three first speakers) who speak "Japanese", "English", and "Chinese", respectively, use the spoken dialog device 1 at "Tokyo".

Upon a user powering on the spoken dialog device 1, the second dialog action tag acquisition subunit 1403 of the spoken dialog device 1 acquires a second dialog action tag "intro" corresponding to the initial node, from the dialog structure information management table shown in FIG. 8. Here, the initial node is, for example, a node corresponding to the starting node identifier "0".

Next, the sentence acquisition subunit 1404 acquires output sentences corresponding to the acquired second dialog action tag "intro", namely "こんにちは", "Hello.", and "你好。" from the output sentence information 你好。management table shown in FIG. 11.

Next, the sentence changing subunit 1405 searches the output sentence change information management table for a piece of output sentence change information corresponding to the output sentences. However, the language identifier acquisition unit 13 has not acquired a language identifier, and therefore the sentence changing subunit 1405 does not change the output sentences.

Next, the speech synthesizing unit 1406 converts the output sentences to audio speeches, and pass them to the speech output unit 15. The language identifier acquisition unit 13 has not acquired a language identifier, and therefore the speech output unit 15 outputs the speeches in the all languages.

Next, the current node identifier updating subunit 1407 acquires, from the dialog structure information storage unit 111, an ending node identifier "1" that constitutes a pair with the second dialog action tag "intro" corresponding to the sentences output by the speech output unit 15, and loads the ending node identifier to the memory. Furthermore, the current node identifier updating subunit 1407 replaces the current node identifier stored in the current node identifier storage unit 115 with the acquired ending node identifier "1".

Next, for example, the user who speaks Japanese inputs a speech "osusume no kankoh supotto wa?" to the spoken dialog device 1.

The receiving unit 12 detects a voice section from this spoken voice, and acquires speech data corresponding to this section. Then, the language identifier acquisition unit 13 acquires "Japanese" as the language identifier corresponding to the speech input by the first speaker. Furthermore, the speech recognition unit 1401 performs speech recognition processing, and acquires an input speech text "おすすめの観光スポットは".

Next, the first dialog action tag acquisition subunit 1402 acquires a first language tag corresponding to "おすすめの観光スポットは" as follows. First, the first dialog action tag acquisition subunit 1402 performs morphological analysis on the input speech text "おすすめの観光スポットは". Then, the first dialog action tag acquisition subunit 1402 references the sentence dialog action information management table shown in FIG. 10, sequentially adds a first dialog action tag to each morpheme, in order from the first morpheme, and acquires "おすすめ (eps), の (eps), 観光スポット (q.spot)". Next, the first dialog action tag acquisition subunit 1402 determines "q.spot" as the first dialog action tag corresponding to "おすすめの観光スポットは". Here, the first dialog action tag acquisition subunit 1402 ignores first dialog action tags "(eps)", and adopts "(q.spot)".

Next, the second dialog action tag acquisition subunit 1403 acquires one second dialog action tag corresponding to the acquired first dialog action tag "q.spot". Specifically, the second dialog action tag acquisition subunit 1403 reads out a current node identifier "1" stored in the current node identifier storage unit 115, and loads the current node identifier to the memory.

Next, the second dialog action tag acquisition subunit 1403 acquires two candidate transition destinations indicated by "ID=2" and "ID=3" included in the dialog structure information management table shown in FIG. 8, as transition destinations corresponding to a starting node identifier that matches the acquired current node identifier "1" and to the first dialog action tag "q.spot" acquired by the first dialog action tag acquisition subunit 1402. Using pieces of weight information "¼" and "¾", the second dialog action tag acquisition subunit 1403 selects, as the transition destination, "ID=3" that constitutes a pair with the piece of weight information "¾", which indicates a higher transition probability than the other, and the second dialog action tag acquisition subunit 1403 does not acquire a second dialog action tag. Therefore, no output sentence is acquired or output.

Next, the current node identifier updating subunit 1407 replaces the current node identifier stored in the current node identifier storage unit 115 with the acquired ending node identifier "3".

Next, the execution subunit 1408 acquires an operation identifier "spot search (place)" included in the record corresponding to "ID=3", from the dialog structure information storage unit 111. Then, the execution subunit 1408 causes an operation subunit corresponding to the acquired operation identifier "spot search (place)" to operate. As a result of this search, for example, "Japanese: 京都, English: Kyoto, Chinese: 京都" corresponding to "Ranking=1" in the keyword management table shown in FIG. 12 is found.

Furthermore, the second dialog action tag acquisition subunit 1403 attempts to transition to the next node. That is, the second dialog action tag acquisition subunit 1403 subsequently acquires a second dialog action tag corresponding to a starting node identifier that matches the current node identifier "3" stored in the current node identifier storage unit. That is, the second dialog action tag acquisition subunit 1403 accesses the record indicated by "ID=7" included in the dialog structure information management table shown in FIG. 8, to acquire a second dialog action tag "a.spot".

Next, the sentence acquisition subunit 1404 acquires sentences corresponding to the acquired second dialog action tag "a.spot", namely Japanese: "<spot>がおすすめです。", English: "I recommend <spot>." and Chinese "我的建议是<spot>。". Furthermore, the sentence acquisition subunit 1404 substitutes "京都", "Kyoto", and "京都" for <spot> in Japanese, English, and Chinese sentences, respectively, using the result of the aforementioned search, and generates sentences "京都がおすすめです。", "I recommend Kyoto.", and "我的建议是京都。". Furthermore, the sentence acquisition subunit 1404 selects "京都がおすすめです。" corresponding to the acquired language identifier "Japanese", from among the three sentences.

Next, the sentence changing subunit 1405 searches the output sentence change information management table for a piece of output sentence change information corresponding to the output sentence. However, the language identifier acquisition unit 13 has not acquired a language identifier, and therefore the sentence changing subunit 1405 does not change the output sentence.

Next, the speech synthesizing unit 1406 generates a speech waveform corresponding to the sentence acquired by the sentence changing subunit 1405, namely "京都がおすすめです。".

Next, the speech output unit 15 outputs a spoken speech corresponding to "京都がおすすめです。".

Next, the current node identifier updating subunit 1407 acquires, from the dialog structure information storage unit 111, an ending node identifier "4" that constitutes a pair with the second dialog action tag "a.spot" corresponding to the sentence output by the speech output unit 15, and loads the ending node identifier to the memory. Furthermore, the current node identifier updating subunit 1407 replaces the current node identifier stored in the current node identifier storage unit 115 with the acquired ending node identifier "4".

Next, for example, the user who speaks Japanese and who input the previous speech inputs a speech "arigato" to the spoken dialog device 1.

Next, the receiving unit 12 receives the speech "arigato" input by the first speaker. Then, the language identifier acquisition unit 13 acquires "Japanese" as the language identifier corresponding to the speech input by the first speaker. Furthermore, the speech recognition unit 1401 performs speech recognition processing, and acquires an input speech text "ありがとう".

Next, the first dialog action tag acquisition subunit 1402 acquires the first dialog action tag "thanks" corresponding to "ありがとう" indicated by "ID=3" included in the sentence dialog action information management table shown in FIG. 10.

Next, the second dialog action tag acquisition subunit 1403 acquires one second dialog action tag corresponding to the acquired first dialog action tag "thanks" and the current node identifier "4" stored in the current node identifier storage unit 115. No second dialog action tag is indicated by "ID=8" included in the dialog structure information management table shown in FIG. 8, and therefore the second dialog action tag acquisition subunit 1403 does not acquire a second dialog action tag. Therefore, no output sentence is acquired or output.

Next, the current node identifier updating subunit 1407 replaces the current node identifier stored in the current node identifier storage unit 115 with the acquired ending node identifier "1".

Next, for example, another user inputs a speech in English "What do you recommend for sightseeing?" to the spoken dialog device 1.

Next, the receiving unit 12 receives the input speech "What do you recommend for sightseeing?" from the first speaker who is different from the aforementioned first speaker who speaks Japanese. Then, the language identifier acquisition unit 13 acquires "English" as the language identifier corresponding to the speech input by the first speaker. Furthermore, the speech recognition unit 1401 performs speech recognition processing, and acquires an input speech text "What do you recommend for sightseeing?"

Next, the first dialog action tag acquisition subunit 1402 acquires a first dialog action tag corresponding to "What do you recommend for sightseeing?" as follows. First, the first dialog action tag acquisition subunit 1402 performs morphological analysis on the input speech text "What do you recommend for sightseeing?" Then, the first dialog action tag acquisition subunit 1402 references the sentence dialog action information management table shown in FIG. 10, and adds a first dialog action tag to each morpheme, in order from the first morpheme, and acquires "What (eps) do (eps) you (eps) recommend for sightseeing (q.spot)". Next, the first dialog action tag acquisition subunit 1402 determines "q.spot" as the first dialog action tag corresponding to "What do you recommend for sightseeing?" Here, the first dialog action tag acquisition subunit 1402 ignores first dialog action tags "(eps)", and adopts "(q.spot)".

Next, the second dialog action tag acquisition subunit 1403 acquires two candidate transition destinations "ID=2" and "ID=3" included in the dialog structure information management table shown in FIG. 8, as transition destinations corresponding to a starting node identifier that matches the acquired current node identifier "1" and to the first dialog action tag "q.spot" acquired by the first dialog action tag acquisition subunit 1402. Among the candidates, "ID=3" has already been passed through. Therefore the second dialog action tag acquisition subunit 1403 selects "ID=2" as the transition destination and does not acquire a second dialog action tag. Therefore, no output sentence is acquired or output.

Next, the current node identifier updating subunit 1407 replaces the current node identifier stored in the current node identifier storage unit 115 with the acquired ending node identifier "2".

Next, the execution subunit 1408 acquires an operation identifier "spot search (user)" included in the record corresponding to "ID=2", from the dialog structure information storage unit 111. Then, the execution subunit 1408 causes an operation subunit corresponding to the acquired operation identifier "spot search (user)" to operate. As a result of this search, "Japanese: 北海道, English: Hokkaido, Chinese: 北海道" corresponding to "Ranking=2" in the keyword management table shown in FIG. 12 is found, for example.

Furthermore, the second dialog action tag acquisition subunit 1403 attempts to transition to the next node. That is, the second dialog action tag acquisition subunit 1403 subsequently acquires a second dialog action tag corresponding to a starting node identifier that matches the current node identifier "2" stored in the current node identifier storage unit. That is, the second dialog action tag acquisition subunit 1403 accesses the record indicated by "ID=6" included in the dialog structure information management table shown in FIG. 8, to acquire a second dialog action tag "a.spot".

Next, the sentence acquisition subunit 1404 acquires sentences corresponding to the acquired second dialog action tag "a.spot", namely Japanese "<spot>がおすすめです。", English: "I recommend <spot>.", and Chinese: "我的建议是<spot>。". Furthermore, the sentence acquisition subunit 1404 substitutes "北海道", "Hokkaido", and "北海道" for <spot> in Japanese, English, and Chinese sentences, respectively, using the result of the aforementioned search, and generates sentences "北海道がおすすめです。", "I recommend Hokkaido.", and "我的建议是北海道。". Furthermore, the sentence acquisition subunit 1404 selects "I recommend Hokkaido." corresponding to the acquired language identifier "English", from among the three sentences.

Next, the sentence changing subunit 1405 searches the output sentence change information shown in FIG. 13 for a piece of output sentence change information that matches the sentence. The language identifier "English" previously acquired by the language identifier acquisition unit 13 satisfies the language condition, and sentence previously acquired by the sentence acquisition subunit 1404 includes "Hokkaido", and therefore the sentence changing subunit 1405 determines that "ID=1" shown in FIG. 13 matches the sentence. Furthermore, the sentence changing subunit 1405 changes the sentence according to a change range and a change content included in the output sentence change information indicated by "ID=1". Specifically, the sentence changing subunit 1405 "adds" "Hokkaido is located in the northern part of Japan" to "sentence end" of the sentence "I recommend Hokkaido." that includes a change range "Hokkaido". As a result, "I recommend Hokkaido. Hokkaido is located in the northern part of Japan" is acquired from the output sentence "I recommend Hokkaido."

Next, the speech synthesizing unit 1406 generates a speech waveform corresponding to the output sentence acquired by the sentence changing subunit 1405: "I recommend Hokkaido. Hokkaido is located in the northern part of Japan."

Next, the speech output unit 15 outputs a spoken speech of the output sentence acquired by the sentence changing unit 1405. Note that the speech output unit 15 may output a spoken speech saying "I recommend Hokkaido. Hokkaido is located in the northern part of Japan." based on the acquired language identifier "English" acquired by the language identifier acquisition unit 13. In this example, output sentences other than the output sentence in English are discarded. However, they may not be discarded. The output sentences in all of the languages may be displayed on a screen, or converted to speech waveforms and output.

Next, the current node identifier updating subunit 1407 acquires, from the dialog structure information storage unit 111, an ending node identifier "4" that constitutes a pair with the second dialog action tag "a.spot" corresponding to the sentence output by the speech output unit 15, and loads the ending node identifier to the memory.

Next, the current node identifier updating unit 1407 replaces the current node identifier stored in the current node identifier storage unit 115 with the acquired ending node identifier "2".

Next, for example, the user inputs a speech "Dore kurai kakaru?" to the spoken dialog device 1. The following three matters are important in this example.

1. The answer to the previous question "What do you recommend for sightseeing?" by the English speaker was output in Japanese and Chinese as well as in English, and people who do not understand English can understand that the spoken dialog system recommended Hokkaido as a sightseeing place.

2. Therefore, although the current question by the Japanese speaker does not include a mention of a destination, the question is about the time and cost required to get to Hokkaido.

3. The internal state of the spoken dialog system has transitioned to a state indicated by the node identifier "4" in FIG. 9 as a result of the previous question by the English speaker. Therefore, although the input language is different from the previous language, a response that is dependent on the previous question is generated.

The receiving unit 12 detects a voice section from this spoken voice, and acquires speech data corresponding to this section. Then, the language identifier acquisition unit 13 acquires "Japanese" as the language identifier corresponding to the speech input by the first speaker. Furthermore, the speech recognition unit 1401 performs speech recognition processing, and acquires an input speech text "どれくらいかかる".

The result of speech recognition this time, namely "どれくらいかかる?", corresponds to "ID=7" in the sentence dialog action information management table shown in FIG. 10, and therefore the first dialog action tag acquisition subunit 1402 acquires a first dialog action tag "q.how-to-take".

Next, the second dialog action tag acquisition subunit 1403 acquires one second dialog action tag corresponding to the acquired first dialog action tag "q.how-to-take". Specifically, the second dialog action tag acquisition subunit 1403 reads out a current node identifier "4" stored in the current node identifier storage unit 115, and loads the current node identifier to the memory.

Next, the second dialog action tag acquisition subunit 1403 acquires, from the dialog structure information management table shown in FIG. 8, a second dialog action tag "a.how-to-take" corresponding to a starting node identifier that matches the acquired current node identifier "4" and to the first dialog action tag "q.how-to-take" acquired by the first dialog action tag acquisition subunit 1402.

Next, the sentence acquisition subunit 1404 acquires sentences corresponding to the acquired second dialog action tag "a.how-to-take", namely Japanese: "<from>から<trans>で<time>かかります。", English: "It take <time> by <trans> from <from>.", Chinese: "它需要<time>的<trans>从<from>。". Furthermore, the sentence acquisition subunit 1404 searches the keyword management table. Based on history information indicating that the item indicated by "Ranking=2" in FIG. 2 was selected when the user input voice at the previous time, the sentence acquisition subunit 1404 acquires and substitutes a value in Japanese: "東京", a value in English: "Tokyo", and a value in Chinese "東京" for <from>, and a value in Japanese: "飛行機", a value in English: "airplane", and a value in Chinese: "飞机" for <trans>, and a value in Japanese: "4時間", a value in English: "four hours", and a value in Chinese: "四个小时" for <time>. Thus, the sentence acquisition subunit 1404 acquires a sentence in Japanese: "東京から飛行機で 4 時間かかります。", a sentence in English: "it takes four hours by plane from Tokyo", and a sentence in Chinese: "它需要四个小时 的飞机从東京。". Furthermore, the sentence acquisition subunit 1404 selects "東京から飛行機で 4 時間かかります。" corresponding to the acquired language identifier "Japanese", from among the three sentences.

Next, the sentence changing unit 1405 searches the output sentence change information management table. However, there is no piece of output sentence change information that matches the sentence, and therefore the sentence changing unit 1405 outputs the sentence without change.

Next, the speech synthesizing unit 1406 generates a speech waveform corresponding to the sentence acquired by the sentence changing subunit 1405, namely "東京から飛行機で 4 時間かかります。". Then, the speech output unit 15 outputs a spoken speech saying "東京から飛行機で 4 時間かかります。".

Thereafter, the spoken dialog device 1 and users proceed with dialogs in the same manner according to WFST indicated by the dialog structure information management table shown in FIG. 8.

As described above, according to the present embodiment, the spoken dialog device 1 can provide an appropriate response according to a language used by a user. Also, a user can have more natural continuous dialogs with the spoken dialog device 1.

Also, in the present embodiment, information that is to be supplemented or omitted depending on a language used by a user is separated from dialog structure information and output sentence information, as output sentence change information. Therefore, by changing output sentence change information, it is possible to enable the spoken dialog device 1 to provide an appropriate response according to a language used by a user in any situation.

Also, according to the present embodiment, dialog structure information (the structure of dialog states) and a set of sentences that are available in dialogs are separated from each other. Therefore, by replacing the set of sentences with another set, it is possible to support various kinds of themes (tasks).

In the present embodiment, Japanese and English are taken as examples of language identifiers. However, languages may be classified by country, such as into British English and American English, or by smaller region, such as into standard Japanese and an Osaka dialect of Japanese.

Also, in the present embodiment, some sentences included in output sentence information stored in the output sentence information storage unit 112 (corresponding to change ranges in the sentence change information) may include sentence change information that is information regarding how a sentence in a language corresponding to an input speech is to be changed. Such sentence change information includes the same language condition and the same change content as those in output sentence change information.

Furthermore, processing according to the present embodiment may be realized using software. This software may be distributed via software downloading or the like. Also, this software may be recorded on a recording medium such as a CD-ROM and distributed. Note that this applies to the other embodiments in the present description.

Software that realizes the spoken dialog device 1 according to the present embodiment is a program as follows. That is, the program causes a computer to function as: a receiving unit that detects a voice section from a start point to an end point of an input speech that is spoken in any of two or more different languages, and acquires speech data corresponding to the voice section; a language identifier acquisition unit that acquires a language identifier that identifies a language in which the input speech was spoken; a speech recognition unit that generates a text resulting from speech recognition based on the input speech and the language identifier; a dialog control unit to which a text resulting from speech recognition and a language identifier are input, and that generates a different output sentence depending on a language identifier, while maintaining dialog history even when the language identifier is different from the previous language identifier; a speech synthesizing unit that generates a speech waveform based on the output sentence and the language identifier; and a speech output unit that outputs a speech that is based on a speech waveform generated by the speech synthesizing unit.

Also, a recording medium that can be accessed by a computer includes: a dialog structure information storage unit configured to store dialog structure information that includes one or more pieces of dialog coupling information that is information indicating links between dialogs and that each include a first dialog action tag that abstracts a speech input by a first speaker, and a second dialog action tag that abstracts an output speech output by a second speaker; and an output sentence information storage unit configured to store output speech information that includes a second dialog action tag and one or more sentences, and it is preferable that the program causes a computer to function as a computer in which the dialog control unit includes: a first dialog action tag acquisition subunit that uses a character string acquired by the speech recognition subunit, to acquire, from the dialog structure information storage unit, a first dialog action tag corresponding to the character string; a second dialog action tag acquisition subunit that acquires one second dialog action tag out of one or more second dialog action tags corresponding to the first dialog action tag acquired by the first dialog action tag acquisition subunit; a sentence acquisition subunit that acquires, from the output sentence information storage unit, a sentence corresponding to the second dialog action tag acquired by the second dialog action tag acquisition subunit; and a sentence changing unit that changes the sentence acquired by the sentence acquisition unit according to the language identifier acquired by the language identifier acquisition unit, and acquires the sentence thus changed.

Second Embodiment

The present embodiment describes, as with the first embodiment, a spoken dialog device that, in a case where speeches in multiple languages coexist, generates a spoken dialog sentence while taking over history of dialog carried out in a different language Note that the present embodiment is different from the first embodiment in the structure of dialog structure information. The present embodiment describes a spoken dialog device that can generate a different dialog sentence using dialog structure information that has a different structure compared to the first embodiment.

In the first embodiment, no matter in what languages users speak, if the respective contents of the speeches are the same, the results of speech recognition are converted to the same first dialog action tag, and furthermore, the same second dialog action tag is generated. Then Output sentences in all of the languages are generated when the second dialog action tag is executed, and thereafter an output sentence corresponding to a language identifier is selected, and furthermore, sentence conversion processing is performed depending on the language identifier. In contrast, in the second embodiment, although the conversion to the same first dialog action tag is the same, different second dialog action tags are generated thereafter, according to the language identifier. Then, an output sentence in a single language is generated when the second dialog action tag is executed. However, if output sentences in all languages are desired to be output in a specific situation or depending on a specific content of a speech, the same second dialog action tag is generated regardless of the language identifier. The specific situation is, for example, a situation in which, when the device is started up, for example, the introduction of the device, instructions for use, and so on are desired to be provided in each language using speech synthesis.

Figure 14:
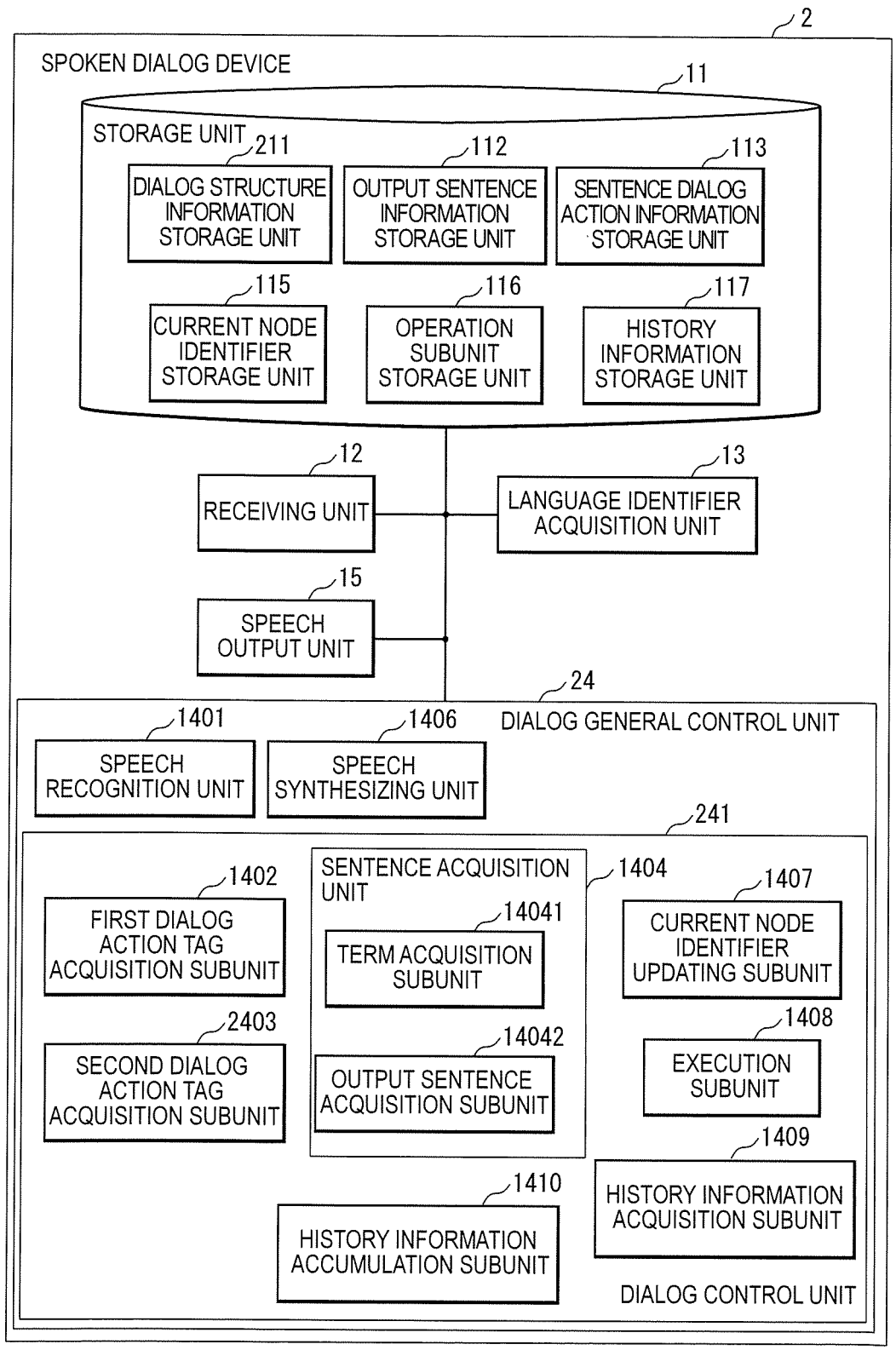
FIG. 14 is a block diagram for a spoken dialog device according to a second embodiment of the present invention.

FIG. 14 is a block diagram for a spoken dialog device 2 according to the present embodiment. The spoken dialog device 2 includes a storage unit 21, a receiving unit 12, a language identifier acquisition unit 13, a dialog general control unit 24, and a speech output unit 15. The storage unit 21 includes a dialog structure information storage unit 211, an output sentence information storage unit 112, a current node identifier storage unit 115, an operation subunit storage unit 116, a history information storage unit 117, and a sentence dialog action information storage unit 113. The dialog general control unit 24 includes a speech recognition unit 1401, a dialog control unit 241, and a speech synthesizing unit 1406. The dialog control unit 241 includes a first dialog action tag acquisition subunit 1402, a second dialog action tag acquisition subunit 2403, a sentence acquisition subunit 1404, a current node identifier updating subunit 1407, an execution subunit 1408, a history information acquisition subunit 1409, and a history information accumulation subunit 1410. The sentence acquisition subunit 1404 includes a term acquisition subunit 14041 and an output sentence acquisition subunit 14042.

As described above, the spoken dialog device 2 is partially different from the spoken dialog device 1. Specifically, the spoken dialog device 2 is the spoken dialog device 1 in which the dialog structure information storage unit 111 is replaced with the dialog structure information storage unit 211, the second dialog action tag acquisition subunit 1403 is replaced with the second dialog action tag acquisition subunit 2403, and furthermore, the sentence changing unit 1405 is removed.

The following describes only portions that are different from the spoken dialog device 1. In the spoken dialog device 2, elements that are assigned the same reference numerals store or process information that is the same as with the spoken dialog device 1.

The dialog structure information storage unit 211, as with the dialog structure information storage unit 111, is configured to store dialog structure information that is information indicating links between dialogs. Dialog structure information includes one or more pieces of dialog coupling information. Dialog link information in the dialog structure information storage unit 211 includes a first dialog action tag that abstracts a speech input by a first speaker (typically, a user), a language identifier corresponding to the speech input by the first speaker, and a second dialog action tag that abstracts an output speech output by a second speaker (typically, the spoken dialog device 2). Here, the language identifier corresponding to the speech input by the first speaker is, typically, an identifier that represents a language in which the input speech was spoken by the first speaker, which is to be acquired by the language identifier acquisition unit 13. One of the first dialog action tag and the second dialog action tag may be empty "eps". Abstracting an input speech or an output speech means classifying the input speech or the output speech into a type, based on the significance or meaning of a sentence included in the input speech or the output speech. A dialog action tag abstracted from an input speech or an output speech is information indicating the type of a dialog action. The details of the dialog action tag are the same as described above. Typically, a speech output from the 10 second speaker is, for example, a speech responding to a speech input by the first speaker. Also, dialog link information may include a starting node identifier, an ending node identifier, a first dialog action tag, a second dialog action tag, and a language identifier. Preferably, the dialog link information also includes weight information that is information indicating the probability of a transition occurring from a node identified by the starting node identifier to a node identified by the ending node identifier. Preferably, dialog link information also includes an operation identifier that is information indicating an operation. Dialog link information includes the staring node identifier and the ending node identifier, and may also include one or more pieces of information among the first dialog action tag, the second dialog action tag, the language identifier, and the operation identifier. The operation identifier is, for example, a function name, a method name, or an execution module name. Here, a node represents a conceptual dialog state. Note that the starting node identifier is information that identifies a node that indicates the start point of a dialog. Similarly, the ending node identifier is information that identifies a node that indicates the end point of a dialog. Note that information indicating links between dialogs may be information indicating links using a starting node identifier included in dialog link information and an ending node identifier included in dialog link information. Furthermore, information indicating links between dialogs may be information that indicates the links by linking pieces of dialog link information to each other using directed links. There are several types of operation identifiers, such as an operation identifier of pre-processing, which is performed on a speech input by the first speaker, an operation identifier of post-processing, which is performed on a sentence output by the second speaker, and an operation identifier of other general processing. Furthermore, each operation identifier may be applied to a different sentence or different information.

The second dialog action tag acquisition subunit 2403 acquires one second dialog action tag corresponding to the language identifier acquired by the language identifier acquisition unit 13, from among one or more second dialog action tags corresponding to the first dialog action tag acquired by the first dialog action tag acquisition subunit 1402. It is also preferable that the second dialog action tag acquisition subunit 2403 acquires one second dialog action tag that corresponds to a starting node identifier that matches the current node identifier stored in the current node identifier storage unit 115, that corresponds to the first dialog action tag acquired by the first dialog action tag acquisition subunit 1402, and that corresponds to the language identifier acquired by the language identifier acquisition unit 13. It is preferable that, when there are two or more candidate second dialog action tags that can be acquired, the second dialog action tag acquisition subunit 2403 use pieces of weight information to select a second dialog action tag that constitutes a pair with a piece of weight information that indicates a relatively high transition probability. When there are two or more candidate second dialog action tags that can be acquired, for example, the second dialog action tag acquisition subunit 2403 may use a piece of weight information corresponding to a starting node identifier that is two or more nodes ahead of the node identified by the current node identifier to apply a DP (Dynamic Programming) algorithm, and use pieces of accumulated weight information, which is information indicating the total weight accumulated through a route, to acquire a second dialog action tag included in a route corresponding to a piece of accumulated weight information indicating the highest transition probability. Furthermore, the second dialog action tag acquisition subunit 1403 may acquire a second dialog action tag corresponding to the initial node (e.g. a node corresponding to the starting node identifier "0" described below) at the beginning of a dialog.

Also, as in the spoken dialog device 1, it is preferable that the storage unit 21 is realized using a non-volatile recording medium. However, it may be realized using a volatile recording medium, and the dialog general control unit 24 can typically be realized using a MPU, a memory, and so on. Furthermore, processing procedures that are performed by the dialog general control unit 24 are typically realized using software, and the software is recorded on a recording medium such as a ROM. However, the dialog general control unit 24 may be realized using hardware (dedicated circuits).

Next, operations of the spoken dialog device 2 will be described with reference to the flowchart shown in FIG. 15.

Step S1501: The receiving unit 12 detects, from audio data input from a microphone or the like, a section (a voice section) that is presumed to be voice provided by a user, who is the first speaker, to a spoken dialog system, and transmits audio data between the start point and the end point of the voice section, to the speech recognition unit 1401. If a voice section is detected, processing proceeds to step S1502, and if not, processing returns to step S1501.

Step S1502: The language identifier acquisition unit 13 identifies the language in which the input speech received in step S1501 was spoken by the first speaker, and acquires a language identifier.

Step S1503: The execution subunit 1408 performs pre-processing. Pre-processing is performed to cause an operation subunit corresponding to a predetermined operation identifier to operate in response to the input speech received in step S1501. For example, the execution subunit 1408 executes noise reduction to remove noise from the input speech.

Step S1504: The speech recognition unit 1401 executes speech recognition on the input speech, and acquires a text corresponding to the input speech.

Step S1505: The first dialog action tag acquisition subunit 1402 performs natural language processing on the text acquired in step S1504, and acquires a first dialog action tag. Such processing is referred to as first dialog action tag acquisition processing. Details of first dialog action tag acquisition processing have been described with reference to the flowchart shown in FIG. 3.

Step S1506: The second dialog action tag acquisition subunit 2403 acquires one second dialog action tag corresponding to the first dialog action tag acquired in step S1505 and to the language identifier acquired in step S1502. Such processing is referred to as second dialog action tag acquisition processing. Details of second dialog action tag acquisition processing will be described with reference to the flowchart shown in FIG. 16. Note that there may be a case in which a second dialog action tag cannot be acquired in this step.

Step S1507: if the dialog general control unit 24 succeeds in acquiring a second dialog action tag in step S1506, processing proceeds to step S1508, and if not, processing proceeds to step S1512. Note that a direct jump to step S1512 occurring when a second dialog action tag cannot be acquired means that no output sentence or speech is output. Alternatively, a special symbol representing that the output is "empty" may be output, and thereafter a jump to step S1512 may occur.

Step S1508: The sentence acquisition subunit 1404 acquires, from the output sentence information storage unit 112, a sentence corresponding to the second dialog action tag acquired in step S1506. Such processing is referred to as sentence acquisition processing. Details of sentence acquisition processing have already been described with reference to the flowchart shown in FIG. 5.

Step S1510: The speech synthesizing unit 1406 generates a speech waveform corresponding to the output sentence acquired in step S1508.

Step S1511: The speech output unit 15 outputs a speech corresponding to the speech waveform acquired in step S1510. Outputting performed here may be outputting a speech to a loudspeaker or the like of the spoken dialog device 2, transmitting a speech to a speech output device (not shown), or performing processing to pass a speech waveform to another program or the like.

Step S1512: The execution subunit 1408 performs so-called post-processing. Details of post-processing have been described with reference to the flowchart shown in FIG. 7. Thereafter, processing returns to step S1501. As a result of processing returning to step S1501, dialog between the user and the spoken dialog device 2 successively progresses.

Figure 15:
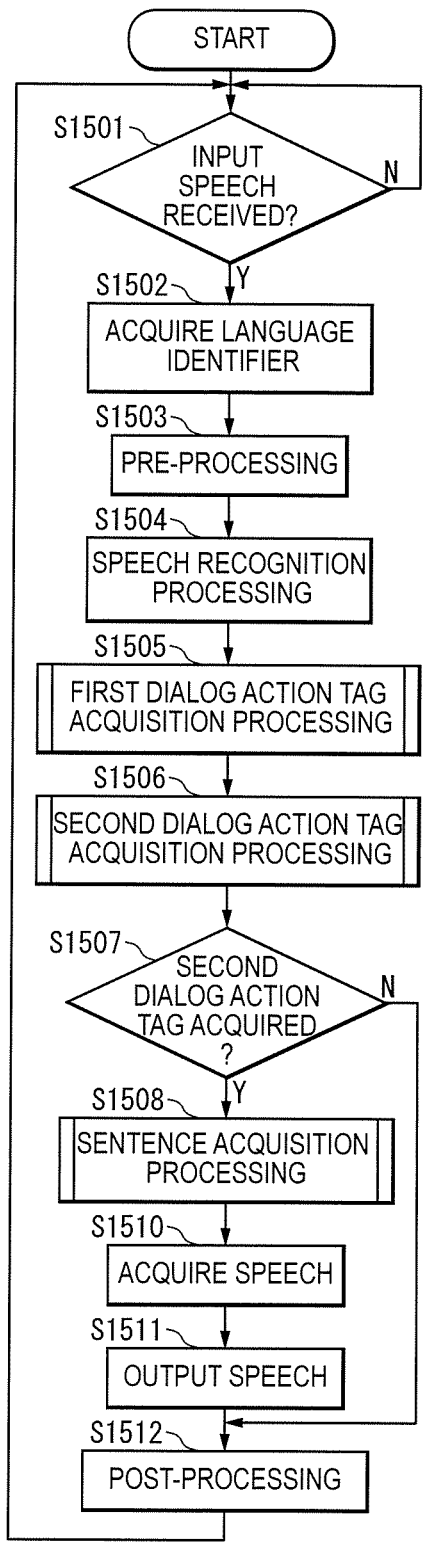
FIG. 15 is a flowchart showing operations of the spoken dialog device according to the embodiment.

Note that pre-processing may be omitted from the flowchart shown in FIG. 15.

In the flowchart shown in FIG. 15, after post-processing has been processed in step S1512, processing returns to step S1501. However, pieces of dialog link information linked one after another in the dialog structure information storage unit 211 may be processed until processing reaches a node (state) representing that a speech input by the user is received (until processing proceeds to dialog link information representing that a speech input by the user is received). Such processing corresponds to steps S1502 to S1512. Details thereof will be described in a specific example below.

In the flowchart shown in FIG. 15, processing may be started from step S1506.

Also, in the flowchart shown in FIG. 15, processing ends at power off or at an interruption of ending processing.

Next, details of second dialog action tag acquisition processing in step S206 will be described with reference to the flowchart shown in FIG. 16.

Step S1601: The second dialog action tag acquisition subunit 2403 reads out a current node identifier stored in the current node identifier storage unit 115. Next, the second dialog action tag acquisition subunit 2403 acquires, from the dialog structure information storage unit 211, one or more second dialog action tags that correspond to a starting node identifier that matches the current node identifier, that correspond to the first dialog action tag acquired by the first dialog action tag acquisition subunit 1402, and that correspond to the language identifier acquired by the language identifier acquisition unit 13.

Step S1602: The second dialog action tag acquisition subunit 2403 substitutes 1 for the counter i.

Step S1603: The second dialog action tag acquisition subunit 2403 determines whether or not the one or more second dialog action tags acquired in step S1601 include a second dialog action tag that constitutes a pair with a piece of weight information that indicates the $i^{th}$ highest transition probability. If there is such a second dialog action tag, processing proceeds to step S1604, and if not, processing proceeds to step S1607. Note that such determination is performed with reference to dialog structure information stored in the dialog structure information storage unit 211.

Step S1604: The second dialog action tag acquisition subunit 2403 acquires a second dialog action tag that constitutes a pair with a piece of weight information indicating the $i^{th}$ highest transition probability, out of the one or more second dialog action tags acquired in step S1601, and loads the second dialog action tag to the memory.

Step S1605: The second dialog action tag acquisition subunit 2403 determines whether or not a sentence corresponding to the second dialog action tag that constitutes a pair with the piece of weight information indicating the $i^{th}$ highest transition probability has been output (whether or not the second dialog action tag that constitutes a pair with the piece of weight information indicating the $i^{th}$ highest transition probability has been processed). If such a second dialog action tag has been processed, processing proceeds to step S1606, and if not, processing proceeds to step S1608.

Step S1606: The second dialog action tag acquisition subunit 2403 increments the counter i by one, and processing returns to step S1603.

Step S1607: The second dialog action tag acquisition subunit 2403 determines a default second dialog action tag as an ultimate second dialog action tag, and processing returns to upper-level processing. The default second dialog action tag is, for example, "Confirm", with which the spoken dialog device 2 asks for the user's confirmation. Note that, if processing does not go through step S1607, there is no need to store the default second dialog action tag in advance.

Step S1608: The second dialog action tag acquisition subunit 2403 determines, as an ultimate second dialog action tag, a second dialog action tag that constitutes a pair with a piece of weight information that indicates the $i^{th}$ highest transition probability, and processing returns to upper-level processing.

Figure 16:
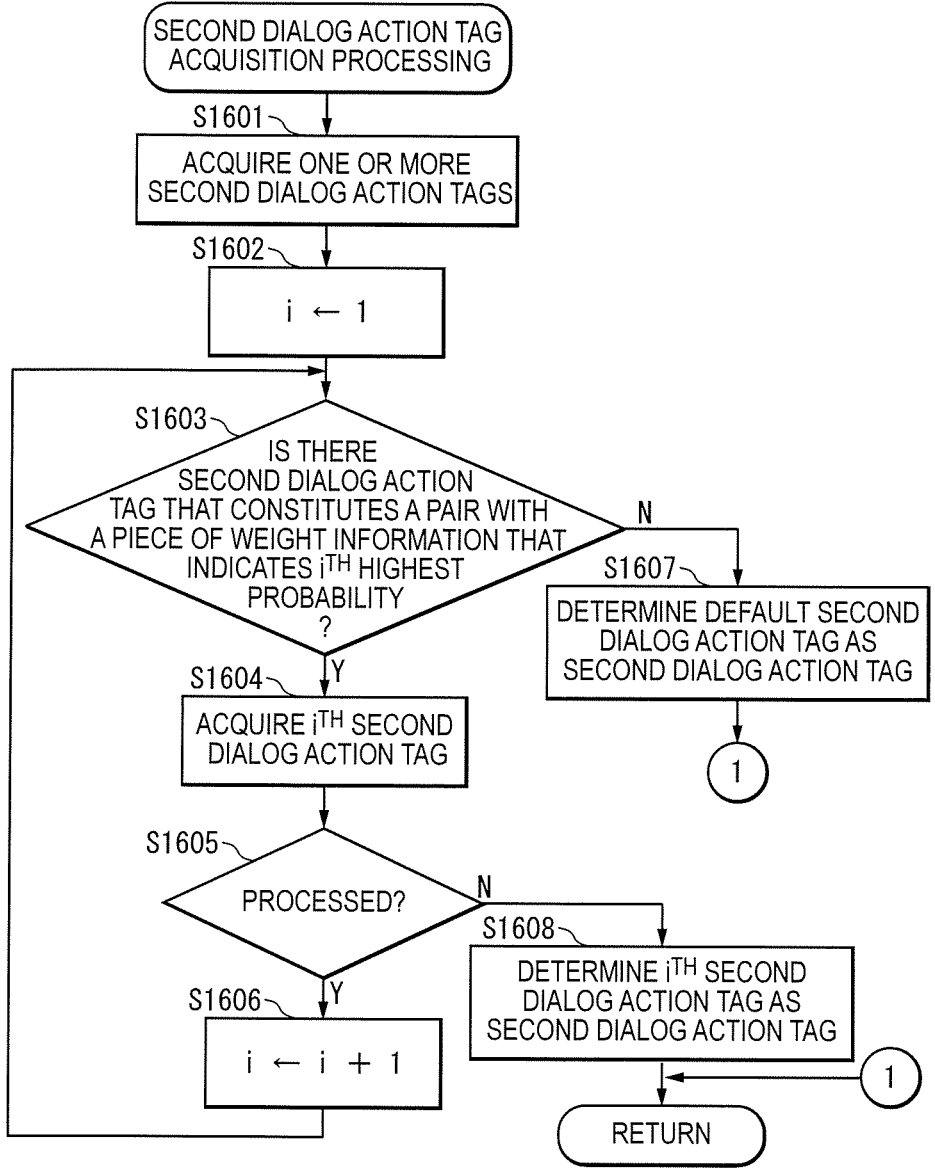
FIG. 16 is a flowchart showing operations for second dialog action tag acquisition processing according to the embodiment.

Note that, in the flowchart shown in FIG. 16, a flag is attached to a second dialog action tag that has already been processed, for example.

The following describes specific operations of the spoken dialog device 2 according to the present embodiment.

Now, the dialog structure information storage unit 211 stores a dialog structure information management table, which is shown in FIG. 17. The dialog structure information management table holds one or more records of dialog link information. Dialog link information has attributes: "ID", "starting node identifier", "ending node identifier", "first dialog action tag", "language identifier", and "second dialog action tag". Note that dialog link information has attribute values of "starting node identifier" and "ending node identifier", and attribute value(s) of one or more attributes out of "first dialog action tag", "language identifier", and "second dialog action tag". In FIG. 17, "-" in "first dialog action tag" and "second dialog action tag" represents NULL. Also, "-" in "language identifier" represents every language identifier. Furthermore, although not shown in the figure, the records of dialog link information may have an input-waiting flag indicating that the node is for waiting for a speech to be input from the user. In FIG. 17, an input-waiting flag is assigned to records with IDs 1, 2, 3, 4, 6, 7, and 8.

Figure 18:
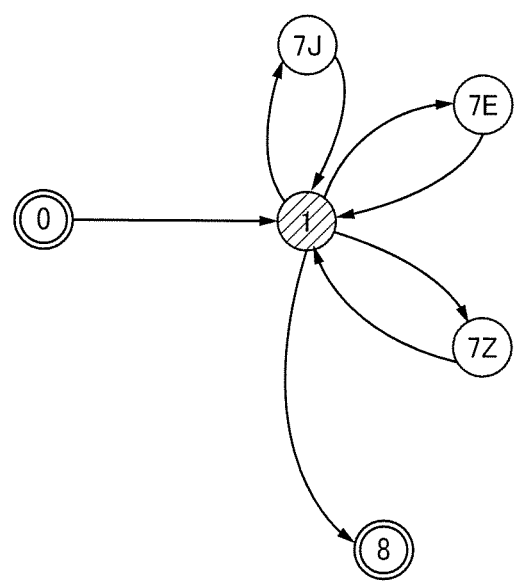
FIG. 18 is a dialog state transition diagram according to the embodiment.

Furthermore, the dialog structure information management table shown in FIG. 17 can be represented using a dialog state transition diagram shown in FIG. 18. The dialog state transition diagram shown in FIG. 17 is so-called FST. In the dialog state transition diagram shown in FIG. 18, shaded nodes (states) are nodes that are waiting for a sentence to be input from the user. "0" in the double circles is the initial node, which is a node that indicates the start of a dialog. "8" in the double circles is the end node, which is a node that indicates the end of the dialog.

Also, the output sentence information storage unit 112 stores an output sentence information management table, which is shown in FIG. 19. The output sentence information management table includes "ID" and "output sentence information". "Output sentence information" includes "dialog action tag" and "output sentence" in Japanese, English, and Chinese. "-" in "output sentence" represents that there is no output sentence.

The sentence dialog action information storage unit 113 stores a sentence dialog action information management table, which is shown in FIG. 10.

The following describes an example in such a situation, where three users (three first speakers) who speak "Japanese", "English", and "Chinese", respectively, use the spoken dialog device 2.

Upon a user powering on the spoken dialog device 2, the second dialog action tag acquisition subunit 2403 of the spoken dialog device 2 acquires a second dialog action tag "intro" corresponding to the initial node, from the dialog structure information management table shown in FIG. 17. Here, the initial node is, for example, a node corresponding to the starting node identifier "0".

Next, the sentence acquisition subunit 1404 acquires output sentences corresponding to the acquired second dialog action tag "intro", namely "こんにちは。", "Hello.", and "你好。" from the output sentence information management table shown in FIG. 19.

Next, the speech synthesizing unit 1406 converts the output sentences to audio speeches, and pass them to the speech output unit 15. The language identifier acquisition unit 13 has not acquired a language identifier, and therefore the speech output unit 15 outputs the speeches in the all languages.

Next, the current node identifier updating subunit 1407 acquires, from the dialog structure information storage unit 211, an ending node identifier "1" that constitutes a pair with the second dialog action tag "intro" corresponding to the sentences output by the speech output unit 15, and loads the ending node identifier to the memory. Furthermore, the current node identifier updating subunit 1407 replaces the current node identifier stored in the current node identifier storage unit 115 with the acquired ending node identifier "1".

Next, for example, the user who speaks Japanese inputs a speech "kyo no tenki wa?" to the spoken dialog device 2.

The receiving unit detects a voice section from this spoken voice, and acquires speech data corresponding to this section. Then, the language identifier acquisition unit 13 acquires "Japanese" as the language identifier corresponding to the speech input by the first speaker. Furthermore, the speech recognition unit 1401 performs speech recognition processing, and acquires an input speech text "今日の天気は".

Next, the first dialog action tag acquisition subunit 1402 acquires a first dialog action tag "q.weather" because "天気" included in "今日の天気は" corresponds to "ID=8" in the sentence dialog action information management table shown in FIG. 10.

Next, the second dialog action tag acquisition subunit 2403 acquires one second dialog action tag corresponding to the acquired first dialog action tag "q.weather" and to the language identifier "Japanese". Specifically, the second dialog action tag acquisition subunit 2403 reads out a current node identifier "1" stored in the current node identifier storage unit 115, and loads the current node identifier to the memory.

Next, the second dialog action tag acquisition subunit 2403 accesses a record indicated by "ID=2" in the dialog structure information management table shown in FIG. 17, which is a transition destination corresponding to a starting node identifier that matches the acquired current node identifier "1", to the first dialog action tag "q.weather" acquired by the first dialog action tag acquisition subunit 1402, and to the language identifier "Japanese" acquired by the language identifier acquisition unit 13, and the second dialog action tag acquisition subunit 2403 acquires a second dialog action tag "a.weather.ja".

Next, the sentence acquisition subunit 1404 acquires a sentence "今日は、黄砂に注意して下さい。" corresponding to the acquired second dialog action tag "a.weather.ja" from the output sentence information management table shown in FIG. 19.

Next, the speech synthesizing unit 1406 acquires a speech waveform converted from the sentence "今日は、黄砂に注意して下さい。" acquired by the sentence acquisition subunit 1404. Then, the speech output unit 15 outputs the speech waveform.

Next, the current node identifier updating subunit 1407 acquires, from the dialog structure information storage unit 211, an ending node identifier "7J" that constitutes a pair with the second dialog action tag "a.weather.ja" corresponding to the sentence output by the speech output unit 15, and loads the ending node identifier to the memory. Furthermore, the current node identifier updating subunit 1407 replaces the current node identifier stored in the current node identifier storage unit 115 with the acquired ending node identifier "7J".

Next, for example, the user who speaks Japanese and who input the previous speech inputs a speech "ryokai" to the spoken dialog device 2.

The receiving unit detects a voice section from this spoken voice, and acquires speech data corresponding to this section. Then, the language identifier acquisition unit 13 acquires "Japanese" as the language identifier corresponding to the speech input by the first speaker. Furthermore, the speech recognition unit 1401 performs speech recognition processing, and acquires an input speech text "了解".

Next, the first dialog action tag acquisition subunit 1402 attempts to acquire a first dialog action tag corresponding to "了解". The morpheme "了解" does not match any record shown in FIG. 10, and therefore, the first dialog action tag for the morpheme "了解" is "eps". Furthermore, the input speech is constituted by one morpheme "了解", and therefore the first dialog action tag acquisition subunit 1402 ultimately acquires the first dialog action tag "eps".

Next, the second dialog action tag acquisition subunit 2403 accesses a record indicated by "ID=6" in the dialog structure information management table shown in FIG. 17, which is a transition destination corresponding to a starting node identifier that matches the acquired current node identifier "7J", to the first dialog action tag "eps" acquired by the first dialog action tag acquisition subunit 1402, and to the language identifier "Japanese" acquired by the language identifier acquisition unit 13. No second dialog action tag is indicated by "ID=6" included in the dialog structure information management table shown in FIG. 17, and therefore the second dialog action tag acquisition subunit 2403 does not acquire a second dialog action tag. Therefore, no output sentence is acquired or output.

Next, the current node identifier updating unit 1407 replaces the current node identifier stored in the current node identifier storage unit 115 with the acquired ending node identifier "1".

Next, for example, a user who speaks English inputs a speech "How's today's weather?" to the spoken dialog device 2.

The receiving unit detects a voice section from this spoken voice, and acquires speech data corresponding to this section. Then, the language identifier acquisition unit 13 acquires "English" as the language identifier corresponding to the speech input by the first speaker. Furthermore, the speech recognition unit 1401 performs speech recognition processing, and acquires an input speech text "How's today's weather".

Next, the first dialog action tag acquisition subunit 1402 acquires a first dialog action tag "q.weather" because "weather" included in "How's today's weather" corresponds to "ID=9" in the sentence dialog action information management table shown in FIG. 10.

Next, the second dialog action tag acquisition subunit 2403 acquires one second dialog action tag corresponding to the acquired first dialog action tag "q.weather" and to the language identifier "English". Specifically, the second dialog action tag acquisition subunit 2403 reads out a current node identifier "1" stored in the current node identifier storage unit 115, and loads the current node identifier to the memory.

Next, the second dialog action tag acquisition subunit 2403 accesses a record indicated by "ID=3" in the dialog structure information management table shown in FIG. 17, which is a transition destination corresponding to a starting node identifier that matches the acquired current node identifier "1", to the first dialog action tag "q.weather" acquired by the first dialog action tag acquisition subunit 1402, and to the language identifier "English" acquired by the language identifier acquisition unit 13, and the second dialog action tag acquisition subunit 2403 acquires a second dialog action tag "a.weather.en".

Next, the sentence acquisition subunit 1404 acquires sentences "Today, note the yellow sand phenomenon. The yellow sand phenomenon is dust carried on high winds from China." corresponding to the acquired second dialog action tag "a.weather.en".

Next, the speech synthesizing unit 1406 acquires a speech waveform converted from the sentences "Today, note the yellow sand phenomenon. The yellow sand phenomenon is dust carried on high winds from China." acquired by the sentence acquisition subunit 1404. Then, the speech output unit 15 outputs the speech waveform.

Next, the current node identifier updating subunit 1407 acquires, from the dialog structure information storage unit 211, an ending node identifier "7E" that constitutes a pair with the second dialog action tag "a.weather.en" corresponding to the sentences output by the speech output unit 15, and loads the ending node identifier to the memory. Furthermore, the current node identifier updating subunit 1407 replaces the current node identifier stored in the current node identifier storage unit 115 with the acquired ending node identifier "7E".

Thereafter, the spoken dialog device 2 and users proceed with dialogs in the same manner according to FST indicated by the dialog structure information management table shown in FIG. 17.

As described above, according to the present embodiment, the spoken dialog device 2 can provide an appropriate response according to a language used by a user. Also, a user can have more natural continuous dialogs with the spoken dialog device 2.

Also, according to the present embodiment, a different state transition can be realized for each language used by each user. Therefore, it is possible to output a more appropriate response for each user.

Also, according to the present embodiment, dialog structure information (the structure of dialog states) and a set of sentences that are available in dialogs are separated from each other. Therefore, by replacing the set of sentences with another set, it is possible to support various kinds of themes (tasks).

In the present embodiment, Japanese and English are taken as examples of language identifiers. However, languages may be classified by country, such as into British English and American English, or by smaller region, such as into standard Japanese and an Osaka dialect of Japanese.

In the present embodiment, the spoken dialog device 2 may include a sentence change information storage unit 117 and a sentence changing unit 1405. If the spoken dialog device 2 includes a sentence change information storage unit 117 and a sentence changing unit 1405, the spoken dialog device 2 uses the sentence change information storage unit 117 to perform the same processing as the sentence changing unit 1405 on the output sentence acquired by the sentence acquisition subunit 1404, and thus changes the output sentence. Thereafter, the changed sentence is passed to the speech synthesizing unit 1406.

Software that realizes the spoken dialog device 2 according to the present embodiment is a program as follows. That is, the program causes a computer to function as: a receiving unit that detects a voice section from a start point to an end point of an input speech that is spoken in any of two or more different languages, and acquires speech data corresponding to the voice section; a language identifier acquisition unit that acquires a language identifier that identifies a language in which the input speech was spoken; a speech recognition unit that generates a text resulting from speech recognition, based on the input speech and the language identifier; a dialog control unit to which a text resulting from speech recognition and a language identifier are input, and that generates a different output sentence depending on a language identifier, while maintaining dialog history even when the language identifier is different from the previous language identifier; a speech synthesizing unit that generates a speech waveform based on the output sentence and the language identifier; and a speech output unit that outputs a speech generated by the speech synthesizing unit.

Also, a recording medium that can be accessed by a computer includes: a dialog structure information storage unit configured to store dialog structure information that includes one or more pieces of dialog link information indicating links between dialogs and each including a first dialog action tag that abstracts a speech input by a first speaker, and a second dialog action tag that abstracts an output speech output by a second speaker, the dialog structure information including two or more second dialog action tags that correspond to a language identifier and that are linked to a first dialog action tag; and an output sentence information storage unit configured to store output speech information that includes a second dialog action tag and one or more sentences, and it is preferable that the program causes a computer to function as a computer in which the dialog control unit includes: a first dialog action tag acquisition subunit that uses a character string acquired by the speech recognition subunit, to acquire, from the dialog structure information storage unit, a first dialog action tag corresponding to the character string; a second dialog action tag acquisition subunit that acquires one second dialog action tag that corresponds to the language identifier acquired by the language identifier acquisition unit, out of one or more second dialog action tags corresponding to the first dialog action tag acquired by the first dialog action tag acquisition subunit; and a sentence acquisition subunit that acquires, from the output sentence information storage unit, a sentence corresponding to the second dialog action tag acquired by the second dialog action tag acquisition subunit.

Third Embodiment

The present embodiment describes a speech system that realizes a call via a spoken dialog device in an environment where two or more users speak two or more languages and the users are located in two or more distant places.

Figure 20:
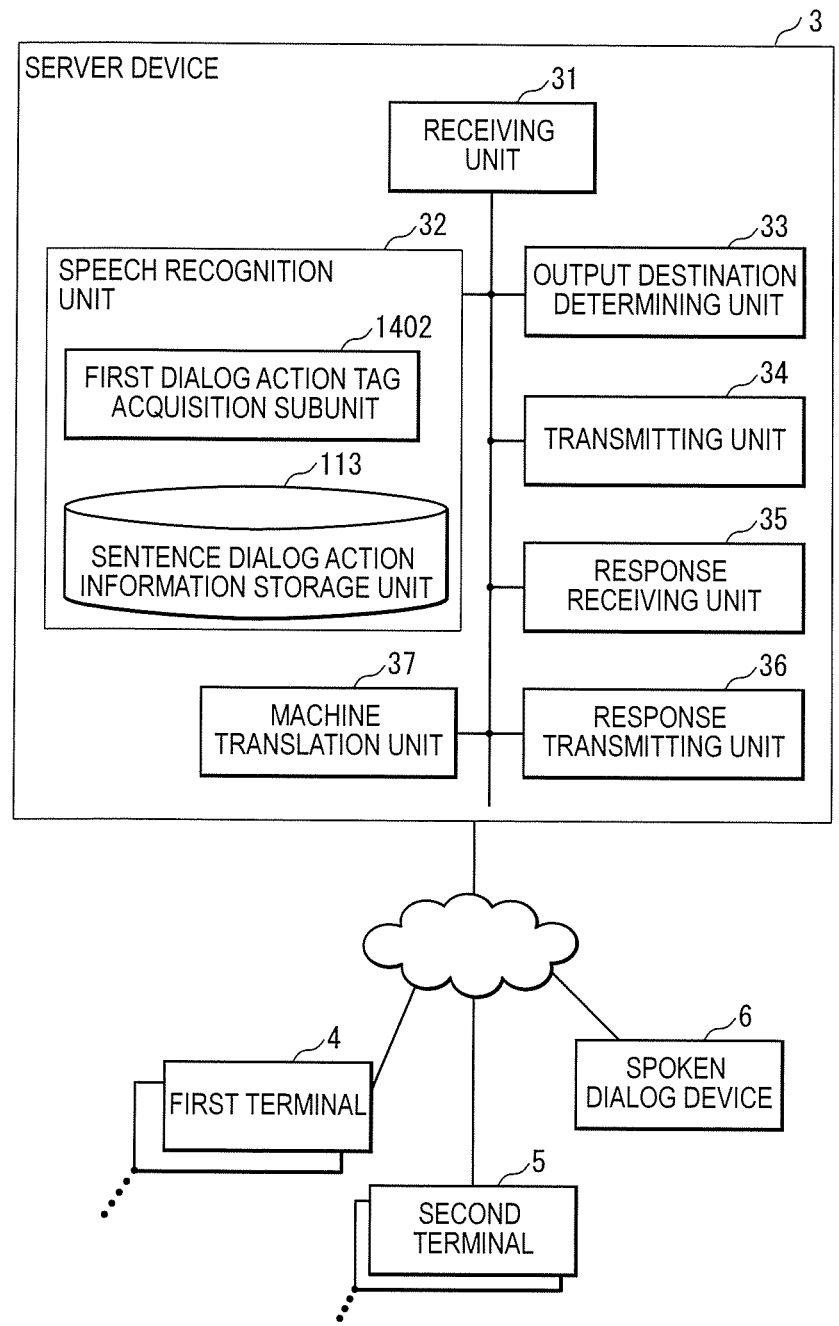
FIG. 20 is a block diagram for a server device according to a third embodiment of the present invention.

FIG. 20 is a block diagram for a speech system according to the present embodiment. The speech system includes a server device 3, one or more first terminals 4, one or more second terminals 5, and a spoken dialog device 6.

The server device 3 is connected to the one or more first terminals 4, the one or more second terminals 5, and the spoken dialog device 6, directly or via a network. The network is a tethered or wireless communication network, and is, for example, the Internet, an intranet, a LAN (Local Area Network), a public telephone network, or the like. The first terminals 4, the second terminals 5, and the spoken dialog device 6 may be any device as long as they are connectable to the server device 3. For example, the first terminals 4, the second terminals 5, and the spoken dialog device 6 may be desktop personal computers, laptop computers, smartphones, tablets, PDAs, or the like. Note that the server device 3 and one first terminal 4 may be realized as one device. Also, the server device 3, the spoken dialog device 6, and one first terminal 4 may be realized as one device.

The spoken dialog device 6 is a device that receives information that is based on an input speech and outputs a response. Information that is based on an input speech is both or either one of the input speech itself and a character string resulting from speech recognition performed on the input speech. Information that is based on an input speech may include a language identifier that identifies the language in which the input speech was spoken. Furthermore, the spoken dialog device 6 may use the server devices 3 to perform some processing. For example, the spoken dialog device 6 may use the server device 3 to perform processing to acquire a first dialog action tag that abstracts an input speech, and adds the acquired first dialog action tag to the aforementioned information that is based on the input speech. Typically, a response output from the spoken dialog device 6 is audio and a text, but may be one of them. The spoken dialog device 6 is, for example, the spoken dialog device 1 described in the first embodiment or the spoken dialog device 2 described in the second embodiment. However, needless to say, the spoken dialog device 6 may be another well-known cross-lingual spoken dialog device or the like. Note that the spoken dialog device 6 may be connected to multiple server devices 3 directly or via a network.

The server device 3 shown in FIG. 20 includes a receiving unit 31, a speech recognition unit 32, an output destination determining unit 33, a transmitting unit 34, a response receiving unit 35, a response transmitting unit 36, and a machine translation unit 37.

The receiving unit 31 receives a speech input by the first speaker, from a first terminal 4. Here, the first terminal 4 is a terminal to which a speech was input, among the first terminals 4. Receiving typically means to receive information transmitted via a tethered or wireless communication network. However, for example, if the server device 3 and the first terminals 4 are realized as one device, the device may directly receive a speech from a microphone of the device, or receive information read out from a recording medium such as an optical disc, a magnetic disk, or a semiconductor memory.

The speech recognition unit 32 performs speech recognition on an input speech received by the receiving unit 31 to acquire a character string. The character string results from speech recognition. The character string mentioned here is, typically, a character string generated by recognizing terms included in each sentence of the input speech. The speech recognition unit 32 may use a speech recognition technology that supports multiple languages to acquire a language identifier that identifies the language in which the recognized speech was spoken, and a character string. The speech recognition technology and the language identification technology are well-known technologies, and therefore descriptions thereof are omitted.

The speech recognition unit 32 may include a first dialog action tag acquisition subunit 1402. If this is the case, for example, the spoken dialog device 6 receives a first dialog action tag that abstracts a speech input by a first speaker, and outputs a sentence represented by a second dialog action tag corresponding to the first dialog action tag, as described in the first embodiment and the second embodiment. If the speech recognition unit 32 includes the first dialog action tag acquisition subunit 1402, the speech recognition unit 32 passes the character string resulting from speech recognition performed on the input speech to the first dialog action tag acquisition subunit 1402 to acquire a first dialog action tag. Also, if the speech recognition unit 32 includes a first dialog action tag acquisition subunit 1402, the speech recognition unit 32 typically includes a sentence dialog action information storage unit 113 as well.

The output destination determining unit 33 uses information that is based on an input speech to determine the output destination of information that is based on the input speech. The output destination determining unit 33 determines a second terminal 5 or the spoken dialog device 6 as the output destination of the information that is based on the input speech, based on information regarding a character string acquired by the speech recognition unit 32. It is preferable that the output destination determining unit 33 determines the output destination of the information that is based on the input speech, based on one or more terms included in the character string acquired by the speech recognition unit 32. Note that information that is based on an input speech is, for example, a character string resulting from speech recognition performed on the input speech, or information that can be acquired from a character string resulting from speech recognition performed on the input speech. Information that can be acquired from a character string is, for example, the above-described first dialog action tag, the above-described first dialog action tag and language identifier, and so on.

If reservation information that has been stored in advance is included in a character string acquired by the speech recognition unit 32, the output destination determining unit 33 determines the spoken dialog device 6 as the output destination. Reservation information is, for example, a character string representing the name of the spoken dialog device 6, a character string representing the nickname thereof, or a character string representing a call such as "Hey". If reservation information that has been stored in advance is not included in a character string acquired by the speech recognition unit 32, the output destination determining unit 33 determines a second terminal 5 as the output destination. Note that one or more pieces of reservation information are stored in a storage unit (not shown).

Also, the output destination determining unit 33 may determine the output destination of information that is based on an input speech, in response to a user instruction received from a first terminal 4. For example, a button showing "ask the spoken dialog device a question" is displayed on the screens of the first terminals 4, and the output destination determining unit 33 determines the spoken dialog device 6 as the output destination of a speech that is input while the button is selected (clicked or tapped), and otherwise determines a second terminal 5 as the output destination. In such a case, the receiving unit 31 receives an output identification flag that identifies the output destination, from a first terminal 4. An output destination identification flag is information indicating a second terminal 5 or the spoken dialog device 6. Another method for determining the output destination is, for example, to capture an image of a user's face using a camera provided in a terminal, detect the orientation of the user's face, the line of sight, and the like from the image, and thereafter transmit an input speech to the spoken dialog device 6 only when the orientations are predetermined orientations. For example, a spoken dialog system agent is displayed at a predetermined position (e.g. a lower right position) on a display device provided in a terminal, and when a user speaks facing toward the agent, the input speech is transmitted to the spoken dialog device 6.

If the output destination determined by the output destination determining unit 33 is a second terminal 5, the transmitting unit 34 transmits information that is based on the input speech to the second terminal 5. Here, information that is based on an input speech is, for example, an input speech. However, information that is based on an input speech here may be, for example, a character string acquired by the speech recognition unit 32, a character string acquired by the machine translation unit 37 performing machine translation, or a speech waveform resulting from additional conversion performed by a speech synthesizing subunit (not shown) on such a character string. Also, information that is based on an input speech here may be two or more pieces of information out of, for example, an input speech, a character string acquired by the speech recognition unit 32, a character string acquired by the machine translation unit 37 performing machine translation, and a speech waveform generated by a speech synthesizing subunit (not shown).

If the output destination determined by the output destination determining unit 33 is the spoken dialog device 6, the transmitting unit 34 transmits information that is based on the input speech to the spoken dialog device 6. Here, information that is based on an input speech is, for example, a character string acquired by the speech recognition unit 32. Also, information that is based on an input speech may be, for example, a first dialog action tag acquired by the first dialog action tag acquisition subunit 1402. Also, information that is based on an input speech may include, for example, a language identifier that indicates the language in which the input speech received by the receiving unit 31 was spoken.

The response receiving unit 35 receives a response to information (typically, a character string) that is based on the input speech transmitted by the transmitting unit 34 to the spoken dialog device 6. Here, receiving typically means to receive information transmitted via a tethered or wireless communication network. However, for example, if the server device 3 and the spoken dialog device 6 are realized as one device, information may be received via another program, module, function or the like on the same computer.

The response transmitting unit 36 transmits a response received by the response receiving unit 35 to the first terminals 4 and the second terminals 5. Here, the response transmitted to the second terminals 5 may be the response from the spoken dialog device 6, a character string acquired through machine translation performed by the machine translation unit 37 described below on the response from the spoken dialog device 6, a speech waveform converted from the character string by a speech synthesizing subunit (not shown), or a combination of them. Also, in addition to information regarding a response from the spoken dialog device 6, a response transmitted to the second terminals 5 may include an input speech received by the receiving unit 31, a character string acquired by the speech recognition unit 32, a character string acquired by the machine translation unit 37 described below performing machine translation on the input speech, or may be a speech waveform converted from the character string by a speech synthesizing subunit (not shown). Also, if a response from the spoken dialog device 6 includes sentences in multiple languages, sentences in all of the languages may be transmitted to each terminal, or, for each terminal, only a sentence corresponding to a language that is used by the user of the terminal may be transmitted to the terminal.

The machine translation unit 37 performs machine translation on a character string acquired by the speech recognition unit 32. The machine translation unit 37 may perform machine translation on a response received by the response receiving unit 35. That is, the machine translation unit 37 acquires a character string that is to be transmitted to the second terminals 5 by the transmitting unit 34 or the response transmitting unit 36, by performing machine translation processing. Here, it is preferable that the machine translation unit 37 translates the response to a different language for each second terminal 5, and such languages are those respectively used by the users of the second terminals 5. Machine translation processing may be performed by another computer, directly or via a network. If this is the case, the machine translation unit 37 is an interface that connects a computer that executes the machine translation processing and the server device 3. Machine translation is a well-known technology, and therefore a description thereof is omitted.

The speech recognition unit 32 and the output destination determining unit 33 can typically be realized using a MPU, a memory, and so on. Furthermore, processing procedures that are performed by the speech recognition unit 32 and the output destination determining unit 33 are typically realized using software, and the software is recorded on a recording medium such as a ROM. However, they may be realized using hardware (dedicated circuits). Also, as in the spoken dialog device 1, it is preferable that the sentence dialog action information storage unit 113 is realized using a non-volatile recording medium. However, it can be realized using a volatile recording medium.

The receiving unit 31, the transmitting unit 34, the response receiving unit 35, and the response transmitting unit 36 are typically realized using a wireless or tethered communication means. However, they may be realized using a broadcast receiving means.

Next, operations of the server device 3 will be described with reference to the flowchart shown in FIG. 21.

Step S2101: The receiving unit 31 determines whether or not an input speech has been received from a first terminal 4. If an input speech has been received, processing proceeds to step S2102, and if not, processing proceeds to step S2101.

Step S2102: The speech recognition unit 32 executes speech recognition on the input speech from the first terminal 4 to acquire a text.

Step S2104: The output destination determining unit 33 determines a second terminal 5 or the spoken dialog device 6 as the output destination. Such processing is referred to as output destination determination processing. Details of output destination determination processing will be described with reference to the flowchart shown in FIG. 22.

Step S2105: The transmitting unit 34 determines whether or not the output destination determined in step S2104 is a second terminal 5 or not. If the output destination is a second terminal 5, processing proceeds to step S2106, and if the output destination is the spoken dialog device 6, processing proceeds to step S2108.

Step S2106: The machine translation unit 37 performs machine translation on the text acquired in step S2102.

Step S2107: The transmitting unit 34 transmits the input speech received in step S2101 to the second terminal 5, and then processing returns to step S2101.

Step S2108: The transmitting unit 34 transmits, to the spoken dialog device 6, the text acquired through speech recognition performed on the input speech acquired in step S2102.

Step S2109: The response receiving unit 35 determines whether or not there is a response from the spoken dialog device 6, to the information transmitted in step S2108. If there is a response, processing proceeds to step S2110, and if not, processing returns to step S2109.

Step S2110: The response transmitting unit 36 transmits the response from the spoken dialog device 6 received in step S2109 to the first terminal 4.

Step S2111: The machine translation unit 37 performs machine translation on the response from the spoken dialog device 6 received in step S2109. Note that the language resulting from machine translation is a language corresponding to a second terminal 5 that is a transmission destination. Language identifiers that identify languages are respectively stored in a storage unit (not shown) in association with one or more second terminals 5 that are transmission destinations. As described above, the spoken dialog device may generate responses in multiple languages, instead of performing translation. In such a case, step S2111 is skipped.

Step S2112: The response transmitting unit 36 transmits, to the second terminal 5, the text resulting from machine translation and acquired in step S2111.

Figure 21:
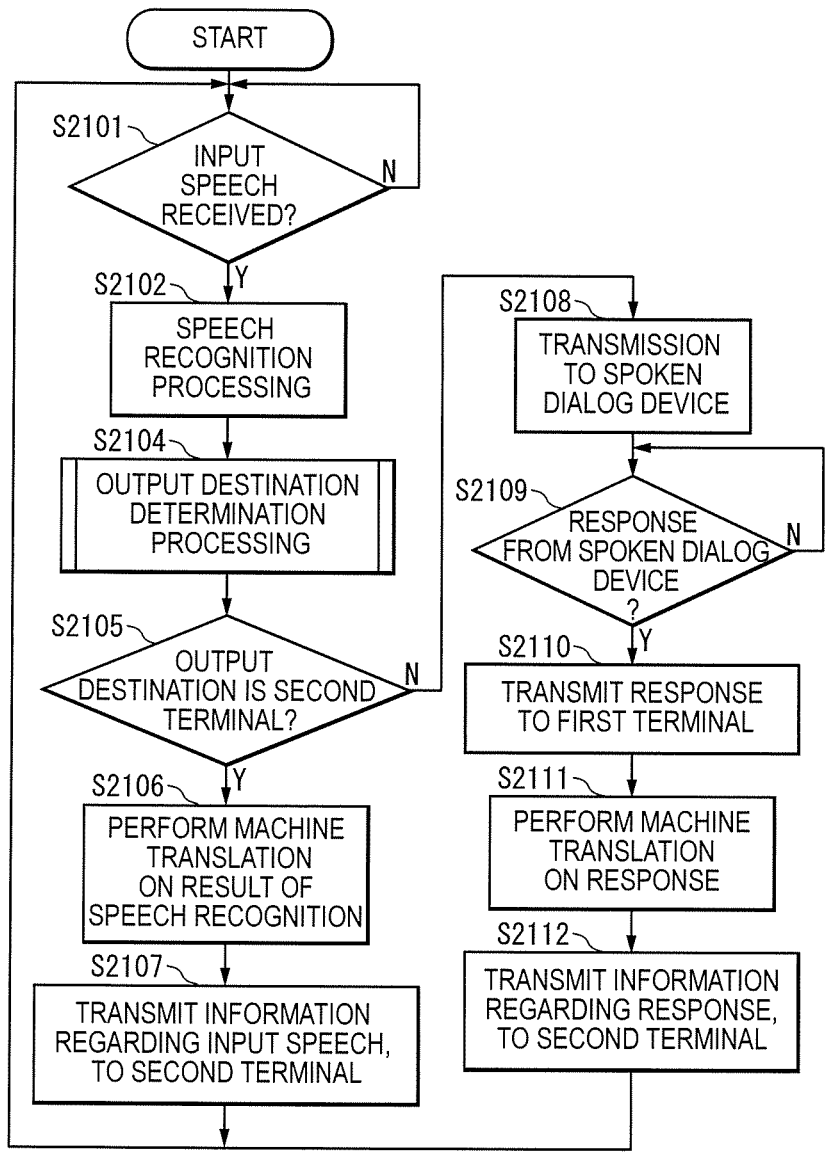
FIG. 21 is a flowchart showing operations of the server device according to the embodiment.

Note that, in the flowchart shown in FIG. 21, in the case where the spoken dialog device 6 receives a first dialog action tag, the transmitting unit 34 transmits the first dialog action tag to the spoken dialog device 6 before transmission processing has been performed in step S2108. Here, the first dialog action tag is acquired by performing first dialog action tag acquisition processing shown in the flowchart in FIG. 3, on the text acquired by performing speech recognition on the input speech acquired in step S2102.

Also, in step S2109 of the flowchart shown in FIG. 21, processing may return to step S2101 when there is no response from the spoken dialog device 6 within a predetermined period of time. Similarly, processing may return to step S2101 when a special symbol indicating "there is no response" is received from the spoken dialog device 6.

Also, in the flowchart shown in FIG. 21, processing ends at power off or at an interruption of ending processing.

Figure 22:
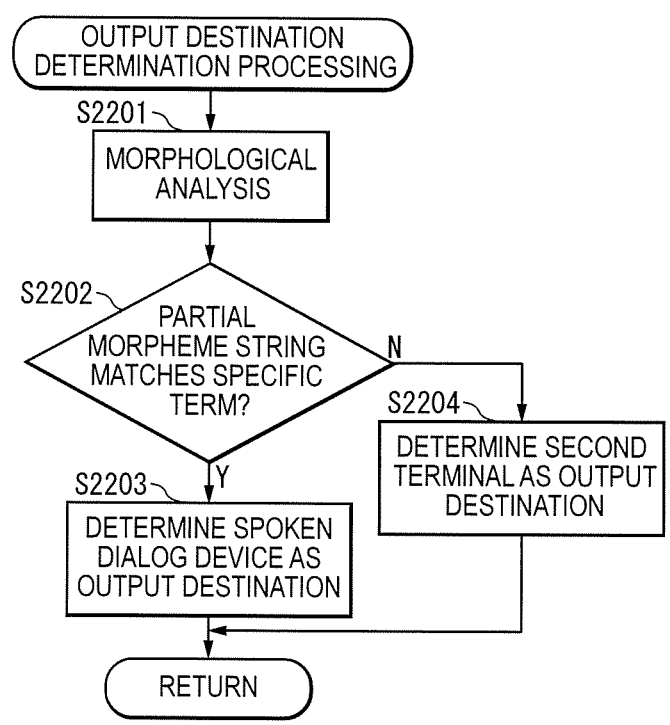
FIG. 22 is a diagram showing output destination determination processing according to the embodiment.

Next, details of output destination determination processing that is performed in step S2104 will be described with reference to the flowchart shown in FIG. 22.

Step S2201: The output destination determining unit 33 performs morphological analysis on the text acquired in step S2102 to acquire a morpheme string of the text.

Step S2202: the output destination determining unit 33 determines whether or not the morpheme string acquired in step S2201 includes a partial morpheme string that matches predetermined specific reservation information. Here, specific reservation information is, for example, the name or the nickname of the spoken dialog device 6.

Step S2203: The output destination determining unit 33 determines the spoken dialog device 6 as the output destination. Thereafter, processing returns to upper-level processing.

Step S2204: The output destination determining unit 33 determines the second terminal 5 as the output destination. Thereafter, processing returns to upper-level processing.

The following describes specific operations of the server device 3 according to the present embodiment.

Here, it is envisaged that, when a speech input to the first terminal 4 includes specific reservation information, the output destination determining unit 33 determines the spoken dialog device 6 as the output destination of the input speech, and specific reservation information is "はんな" (Hanna). Note that specific reservation information "はんな" (Hanna) is stored in the storage unit (not はんなshown) of the server device 3.

Also, the spoken dialog device 6 is a spoken dialog device that uses the same data as the spoken dialog device 1 described in the specific example according to the first embodiment. That is, the spoken dialog device 6 proceeds with dialogs based on the dialog structure information shown in FIG. 8, and outputs a text included in the output sentence information shown in FIG. 11. Although a speech is input to and output from the spoken dialog device 1 described in the specific example according to the first embodiment, a text representing the input speech and a language identifier is input to the spoken dialog device 6 in the present example, and a text representing the output sentence is output therefrom.

Also, the sentence dialog action information storage unit 113 stores the sentence dialog action information management table shown in FIG. 10.

The following describes an implementation example in such a situation, where two users respectively speak Japanese and English, and the Japanese speaker is referred to as a user j and the English speaker is referred to as a user e, and the user j and the user e have a dialog respectively from a terminal J and a terminal E, via the spoken dialog device 6.

First, the user j inputs a speech "konnichiwa" from the terminal J. Here, the terminal J is a first terminal 4.

In response, the receiving unit 31 of the server device 3 detects a voice section corresponding to the spoken voice "konnichiwa", from the received audio data. Next, the speech recognition unit 32 performs speech recognition on the voice section, and acquires a text "こんにちは" and a language identifier "Japanese".

Next, the output destination determining unit 33 analyzes the text "こんにちは" and determines the output destination in the following manner. The output destination determining unit 33 performs morphological analysis on the text, and acquires a morphological analysis string "こんにちは". Note that this morphological analysis string is composed of one morpheme. The morphological analysis string does not include "はんな", and therefore output はんな destination determining unit 33 determines the terminal E, which serves as a second terminal 5, as the output destination.

Next, the machine translation unit 37 translates the text "こんにちは" to acquire a text "Hello". Thereafter, the transmitting unit 34 transmits the text "Hello" to the terminal E.

Next, for example, the user e inputs a speech "Good evening" from the terminal E. Here, the terminal E serves as a first terminal 4.

Then, the receiving unit 31 of the server device 3 receives a speech "Good evening". Next, the speech recognition unit 32 performs speech recognition on the speech, and acquires a text "Good evening" and a language identifier "English".

Next, the output destination determining unit 33 analyzes the text "Good evening" and determines the output destination. The text "Good evening" does not include "Hanna", and therefore the output destination determining unit 33 determines the terminal J, which serves as a second terminal 5, as the output destination.

Next, the machine translation unit 37 performs machine translation on the text "Good evening", and acquires a text "こんばんは". Thereafter, the transmitting unit 34 transmits the text "こんばんは" to the terminal E.

Next, for example, the user j inputs a speech "Hanna, osusume no kankoh supotto wa?" from the terminal J. Here, the terminal J serves as a first terminal 4.

In response, the receiving unit 31 of the server device 3 detects a voice section corresponding to the spoken voice "Hanna, osusume no kankoh supotto war?" from the received audio data. Next, the speech recognition unit 32 performs speech recognition on the voice section, and acquires a text "はんな、おすすめの観光スポットは?" and a language identifier "Japanese".

Next, the output destination determining unit 33 analyzes the text "はんな、おすすめの観光スポットは?", and determines the output destination in the following manner. The output destination determining unit 33 performs morphological analysis on the text, and acquires a morphological analysis string "|はんな|、|おすすめ|の|観光|スポット|は". Here, "|" represents a morpheme boundary. The morpheme string includes "なんな", and therefore the output destination determining unit 33 determines the spoken dialog device 6 as the output destination.

Next, the transmitting unit 34 transmits the text "はんな、おすすめの観光スポットは" and the language identifier "Japanese" to the spoken dialog device 6.

Next, the spoken dialog device 6 receives the text "はんな、おすすめの観光スポットは" and the language identifier "Japanese".

Then, using the text "はんな、おすすめの観光スポットは" and the language identifier "Japanese", the spoken dialog device 6 acquires a first dialog action tag "q.spot", and ultimately acquires a response "京都がおすすめです". Specifically, the spoken dialog device 6 references the dialog structure information management table shown in FIG. 8, acquires the record indicated by "ID=3", and performs a spot search, which is an operation corresponding to the operation identifier of the record. Next, the spoken dialog device 6 acquires the record indicated by "ID=7" in the dialog structure information management table, and acquires a second dialog action tag "a.spot". Next, the spoken dialog device 6 references the output sentence information management table shown in FIG. 11, and acquires an output sentence "京都がおすすめです。", using the second dialog action tag "a.spot" and the language identifier "Japanese".

Next, the spoken dialog device 6 transmits a response "京都がおすすめです。" to the server device 3.

Next, the response receiving unit 35 of the server device 3 receives the response "京都がおすすめです" from the spoken dialog device 6.

Next, the response transmitting unit 36 transmits the response "京都がおすすめです。" to the terminal J. Then, the machine translation unit 37 performs machine translation on the response, and acquires "I recommend Kyoto". Furthermore, the response transmitting unit 36 transmits the result of machine translation "I recommend Kyoto." to the terminal E. Note that, as described above, the spoken dialog device may generate the English response "I recommend Kyoto." in addition to the Japanese response, and transmit it to the terminal E. If this is the case, machine translation processing is skipped.

Next, for example, the user e inputs a speech "Hanna, how long does it take?" from the terminal E. Here, the terminal E serves as a first terminal 4.

In response, the receiving unit 31 of the server device 3 receives the speech "Hanne, how long does it take?" Next, the speech recognition unit 32 performs speech recognition on the speech, and acquires a text "Hanna, how long does it take?" and a language identifier "English".

Next, the output destination determining unit 33 analyzes the text "Hanne, how long does it take?", and determines the output destination. The text includes "Hanna", and therefore, the output destination determining unit 33 determines the spoken dialog device 6 as the output destination.

Next, the transmitting unit 34 transmits the text "Hanne, how long does it take?" and the language identifier "English" to the spoken dialog device 6.

Next, the spoken dialog device 6 receives the text "Hanne, how long does it take?" and the language identifier "English".

Then, using the text "Hanne, how long does it take?" and the language identifier "English", the spoken dialog device 6 acquires a first dialog action tag "q.how-to-take", and ultimately acquires a response "It take 2.5 hours by Shinkansen from Tokyo." Specifically, the spoken dialog device 6 references the dialog structure information management table shown in FIG. 8, acquires the record indicated by "ID=9", and acquires a second dialog action tag "a.how-to-take". Next, the spoken dialog device 6 references the output sentence information management table shown in FIG. 11 and the keyword management table shown in FIG. 13, and acquires an output sentence "It take 2.5 hours by Shinkansen from Tokyo.", using the second dialog action tag "a.how-to-take" and the language identifier "English".

Next, the spoken dialog device 6 transmits the response "It take 2.5 hours by Shinkansen from Tokyo." to the server device 3.

Next, the response receiving unit 35 of the server device 3 receives the response "It take 2.5 hours by Shinkansen from Tokyo." from the spoken dialog device 6.

Next, the response transmitting unit 36 transmits the response "It take 2.5 hours by Shinkansen from Tokyo." to the terminal E. Then, the machine translation unit 37 performs machine translation on the response, and acquires "東京から新幹線で 2.5 時間かかります。". Furthermore, the response transmitting unit 36 transmits the response resulting from machine translation, to the terminal J.

Thereafter, the user j and the user e have a dialog involving the spoken dialog device 6 in the same manner as described above.

As described above, according to the present embodiment, even in a case where two or more users who speak different languages are located in remote places, the users can have dialogs by appropriately employing a spoken dialog device in a videophone, a video conference system, or the like.

Also, according to the present embodiment, even in a case where two or more users who speak different languages are located in remote places, the users can have dialogs by appropriately employing a cross-lingual spoken dialog device as a videophone, a video conference system, or the like Also, according to the present embodiment, speech recognition processing can be separately performed. Therefore, it is possible to realize a load-distributed cross-lingual spoken dialog system.

According to the present embodiment, a text is transmitted to the first terminal 4 and the second terminal 5. However, the transmitting unit 34 and the response transmitting unit 36 may be provided with a speech synthesizing unit 1406 so that a speech can be transmitted to a first terminal 4 and a second terminal 5.

According to the present embodiment, a call involving the cross-lingual spoken dialog device is realized using a single server device 3. However, a plurality of server devices 3 may be used instead. If this is the case, in FIG. 20, each second terminal 5 is connected to another server 3 (not shown) directly or via a network as a first terminal. That is, each first terminal 4 and each second terminal 5 are connected to a single server 3 as a first terminal, and are connected to a server device 3 other than the aforementioned server 3 as a second terminal.

Note that software that realizes the server device according to the present embodiment is a program as follows. That is, the program causes a computer to function as: a receiving unit that receives a speech input by a first speaker from a first terminal, detects a voice section from a start point to an end point of the input speech, and acquires speech data corresponding to the voice section; a speech recognition unit that performs speech recognition on the input speech to acquire a character string; an output destination determining unit that determines an output destination of information that is based on the input speech; a transmitting unit that, if the output destination determined by the output destination determining unit is a second terminal, transmits the information that is based on the input speech to the second terminal, and if the output destination determined by the output destination determining unit is a spoken dialog device, transmits the character string acquired by the speech recognition unit to the spoken dialog device; a response receiving unit that receives a response corresponding to the character string, from the spoken dialog device; and a response transmitting unit that transmits the response received by the response receiving unit to the first terminal and the second terminal.

Also, it is preferable that the program causes a computer to function such that the output destination determining unit determines the output destination of the information that is based on the input speech, according to one or more terms included in the character string acquired by the speech recognition unit.

Also, it is preferable that the program causes a computer to function such that the output destination determining unit determines the output destination of the information that is based on the input speech, according to a user instruction received from the first terminal.

As described above, in all of the embodiments, one or more computers may be provided to execute the programs. That is, centralized processing or distributed processing may be performed.

Also, the functions realized by the above-described programs do not include a function that can be realized only by hardware. For example, the functions of a modem, an interface card, and so on employed by the receiving unit that receives information, the output unit that outputs information, and so on, which can be realized only by hardware, are at least not included in the functions realized by the above-described programs.

These programs may be downloaded from a server or the like so as to be executed, or read out from a predetermined recording medium (e.g. an optical disc such as a CD-ROM, a magnetic disk, a semiconductor memory, or the like) so as to be executed. Also, these programs may be used as programs that constitute a program product.

Figure 23:
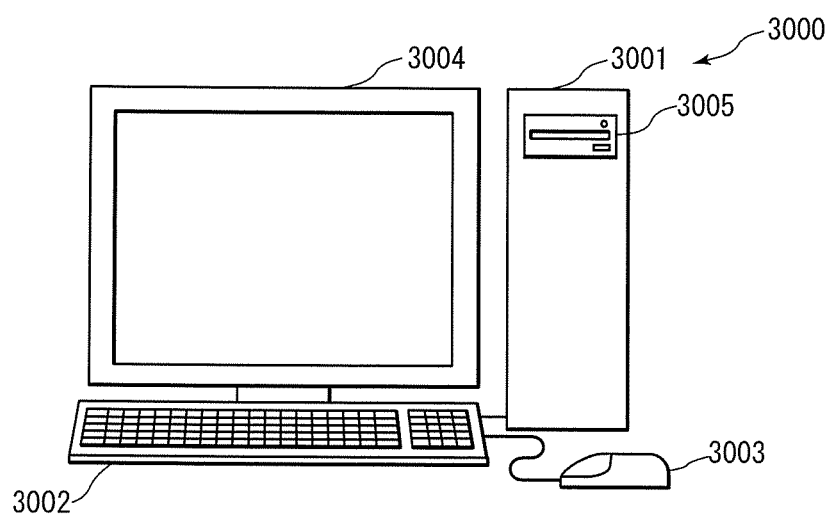
FIG. 23 is a diagram showing an external appearance of a computer system according to the above embodiments.

FIG. 23 is a schematic diagram showing an example of an external appearance of a computer that realizes a spoken dialog device 1 and so on according to the above-described embodiments by executing the above-described programs. The above-described embodiments can be realized using computer hardware and computer programs that are executed thereon.

In FIG. 23, a computer system 3000 includes a computer 3001 that includes a CD-ROM drive 3005, a keyboard 3002, a mouse 3003, and a monitor 3004.

Figure 24:
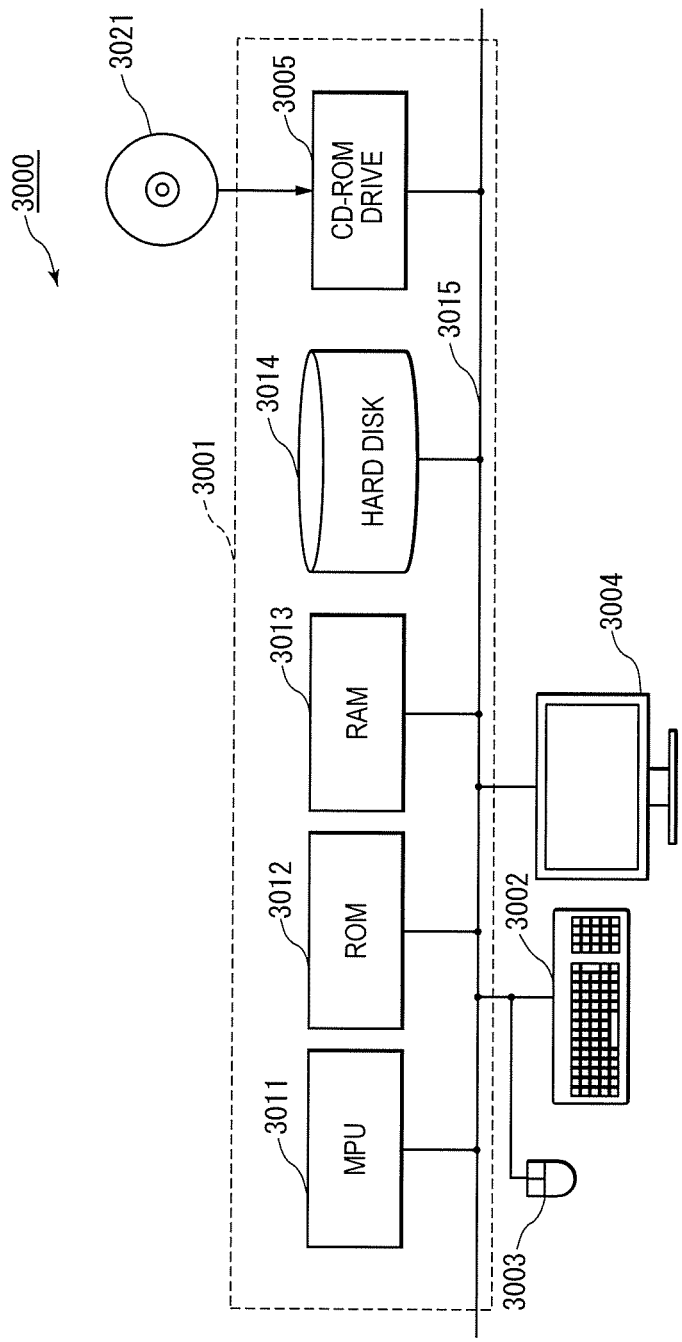
FIG. 24 is a diagram showing an internal configuration of the computer system according to the above embodiments.

FIG. 24 shows an internal configuration of the computer system 3000. In FIG. 24, the computer 3001 includes, in addition to the CD-ROM drive 3005: an MPU (Micro Processing Unit) 3011; a ROM 3012 for storing programs such as a boot-up program; a RAM 3013 that is connected to the MPU 3011, temporarily stores instructions for application programs, and provides a temporal storage space; and a hard disk 3014 in which application programs, system programs, and data are stored; a bus 3015 that connects the MPU 3011, the ROM 3012, and so on to each other. Note that the computer 3001 may include a network card (not shown) that provides connection to a LAN, WAN, or the like.

Programs for causing the computer system 3000 to realize the functions of the spoken dialog device 1 and so on according to the above-described embodiments may be stored in the CD-ROM 3021, and transferred to the hard disk 3014 upon the CD-ROM 3021 being inserted into the CD-ROM drive 3005. Alternatively, the programs may be transmitted to the computer 3001 via a network (not shown), and stored in the hard disk 3014. The programs are loaded to the RAM 3013 when they are to be executed. Note that the programs may be loaded from the CD-ROM 3021 or directly from the network. Also, instead of the CD-ROM 3021, the programs may be read into the computer system 3000 via another recording medium (e.g. a USB memory).

The programs do not necessarily include an operating system (OS), third party programs, or the like that cause the computer 3001 to execute the functions of the spoken dialog device 1 and so on according to the above-described embodiments. The programs may include only some instructions that call appropriate functions and modules in a mode under control so that desirable results can be obtained. How the computer system 3000 operates is well known, and therefore detailed descriptions will be omitted.

Needless to say, the present invention is not limited to the above-described embodiments and may be variously modified, and such modifications are encompassed in the scope of the present invention.

INDUSTRIAL APPLICABILITY

As described above, the spoken dialog device according to the present invention achieves an advantageous effect in that it is possible to appropriately support spoken dialog that is carried out in multiple languages, and is useful as a spoken dialog device and so on.

The invention claimed is:

1. A spoken dialog device for making a conversation between the spoken dialog device and two or more first speakers who utilize different languages from each other, the spoken dialog device comprising:
 a receiving unit that detects a voice section from a start point to an end point of an input speech that is spoken by a first speaker of the two or more first speakers, and acquires speech data corresponding to the voice section;
 a language identifier acquisition unit that acquires a language identifier that identifies a language in which the input speech was spoken;
 a speech recognition unit that generates a text resulting from speech recognition corresponding to the input speech and the language identifier;
 a dialog control unit that acquires an output sentence, in response to dialog history in a series of dialogs with the first speaker, by using the text resulting from speech recognition and the language identifier;
 a speech synthesizing unit that generates a speech waveform corresponding to the output sentence and the language identifier; and
 a speech output unit that outputs a speech that is based on the speech waveform acquired by the speech synthesizing unit, wherein:
 the dialog control unit, when, during the series of dialogs with the first speaker, the first speaker changes to another first speaker and a language identifier acquired by the language identifier acquisition unit changes from a previously acquired language identifier,
 maintains dialog history with the first speaker before the first speaker changes to the another first speaker, and acquires an output sentence by using a text resulting from speech recognition corresponding to an input speech of the another first speaker and a language identifier acquired from the input speech of the another first speaker.

2. The spoken dialog device according to claim 1, further comprising:
 a dialog structure information storage unit configured to store dialog structure information that includes one or more pieces of dialog link information indicating links between dialogs and each including a first dialog action tag that abstracts a speech input by the first speaker, and a second dialog action tag that abstracts an output speech output by a second speaker; and
 an output sentence information storage unit configured to store output speech information that includes a second dialog action tag and one or more sentences,
 wherein the dialog control unit includes:
  a first dialog action tag acquisition subunit that uses a character string acquired by the speech recognition unit, to acquire, from the dialog structure information storage unit, a first dialog action tag corresponding to the character string;
  a second dialog action tag acquisition subunit that acquires one second dialog action tag corresponding to the first dialog action tag acquired by the first dialog action tag acquisition subunit;
  a sentence acquisition subunit that acquires, from the output sentence information storage unit, a sentence corresponding to the second dialog action tag acquired by the second dialog action tag acquisition subunit; and
  a sentence changing unit that changes the sentence acquired by the sentence acquisition unit according to the language identifier acquired by the language identifier acquisition unit, and acquires the sentence thus changed.

3. The spoken dialog device according to claim 1, further comprising:
 a dialog structure information storage unit configured to store dialog structure information that includes one or more pieces of dialog link information indicating links between dialogs and each including a first dialog action tag that abstracts a speech input by the first speaker, and a second dialog action tag that abstracts an output speech output by a second speaker, the dialog structure information including two or more second dialog action tags that correspond to a language identifier and that are linked to a first dialog action tag; and
 an output sentence information storage unit configured to store output speech information that includes a second dialog action tag and one or more sentences,
 wherein the dialog control unit includes:
  a first dialog action tag acquisition subunit that uses a character string acquired by the speech recognition unit, to acquire, from the dialog structure information storage unit, a first dialog action tag corresponding to the character string,
  a second dialog action tag acquisition subunit that acquires one second dialog action tag that corresponds to the language identifier acquired by the language identifier acquisition unit, out of one or more second dialog action tags corresponding to the first dialog action tag acquired by the first dialog action tag acquisition subunit; and
  a sentence acquisition subunit that acquires, from the output sentence information storage unit, a sentence corresponding to the second dialog action tag acquired by the second dialog action tag acquisition subunit.

4. A spoken dialog method for making a conversation between the spoken dialog device and two or more first speakers who utilize different languages from each other, the spoken dialog device, which is realized using a receiving unit, a language identifier acquisition unit, a speech recognition unit, a dialog control unit, a speech synthesizing unit, and a speech output unit, the spoken dialog method comprising:
 a receiving step in which the receiving unit acquires speech data corresponding to a voice section by detecting a start point to an end point of an input speech that is spoken by a first speaker of the two or more first speakers receives an input speech that is spoken in any of two or more different languages;
 a language identifier acquisition step in which the language identifier acquisition unit acquires a language identifier that identifies a language in which the input speech was spoken;
 a speech recognition step in which a speech recognition unit generates a text resulting from speech recognition, based on the input speech and the language identifier;
 a dialog control step in which the dialog control unit acquires an output sentence, in response to dialog history in a series of dialogs with the first speaker, by using the text resulting from speech recognition and the language identifier;

a speech synthesizing step of generating a speech waveform based on the output sentence and the language identifier; and a speech output step in which the speech output unit outputs a speech based on the speech waveform acquired in the speech acquisition step, wherein:

in the dialog control step, when, during the series of dialogs with the first speaker, the first speaker changes to another first speaker and a language identifier acquired by the language identifier acquisition unit changes from a previously acquired language identifier, dialog history with the first speaker before the first speaker changes to the another first speaker is maintained, and an output sentence is acquired by using a text resulting from speech recognition corresponding to an input speech of the another first speaker and a language identifier acquired from the input speech of the another first speaker.

5. A recording medium on which a program is recorded, the program causing a computer to function as a spoken dialog device for making a conversation between the spoken dialog device and two or more first speakers who utilize different languages from each other, comprising:

a receiving unit that detects a voice section from a start point to an end point of an input speech that is spoken by a first speaker of the two or more first speakers, and acquires speech data corresponding to the voice section;

a language identifier acquisition unit that acquires a language identifier that identifies a language in which the input speech was spoken;

a speech recognition unit that generates a text resulting from speech recognition corresponding to the input speech and the language identifier;

a dialog control unit that acquires an output sentence, in response to dialog history in a series of dialogs with the first speaker, by using the text resulting from speech recognition and the language identifier;

a speech synthesizing unit that generates a speech waveform corresponding to the output sentence and the language identifier; and a speech output unit that outputs a speech that is based on the speech waveform acquired by the speech synthesizing unit, wherein:

the dialog control unit, when, during the series of dialogs with the first speaker, the first speaker changes to another first speaker and a language identifier acquired by the language identifier acquisition unit changes from a previously acquired language identifier, maintains dialog history with the first speaker before the first speaker changes to the another first speaker, and acquires an output sentence by using a text resulting from speech recognition corresponding to an input speech of the another first speaker and a language identifier acquired from the input speech of the another first speaker.

* * * * *